United States Patent
Brooks et al.

(10) Patent No.: US 8,971,513 B2
(45) Date of Patent: Mar. 3, 2015

(54) ORIGINATING LOCATOR SERVICE

(75) Inventors: Euclid S. Brooks, Laurel, MD (US);
Jeffrey R. Evans, Lovettsville, VA (US);
Nashwa F. Sidhom, Edison, NJ (US);
Henry L. Tam, Brooklyn, NY (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1204 days.

(21) Appl. No.: 12/472,846

(22) Filed: May 27, 2009

(65) Prior Publication Data
US 2010/0303220 A1   Dec. 2, 2010

(51) Int. Cl.
*H04M 3/42* (2006.01)
*H04M 3/46* (2006.01)
*H04M 3/493* (2006.01)
*H04M 7/00* (2006.01)

(52) U.S. Cl.
CPC .............. *H04M 3/46* (2013.01); *H04M 3/4936* (2013.01); *H04M 7/006* (2013.01); *H04M 2207/08* (2013.01); *H04M 2207/12* (2013.01); *H04M 2207/18* (2013.01)
USPC ............. 379/211.03; 379/207.03; 379/209.01

(58) Field of Classification Search
CPC ...... H04M 3/46; H04M 3/42229; H04M 3/54
USPC ............. 379/142.05, 142.07, 211.03–211.04, 379/211.02, 209.01; 370/259
See application file for complete search history.

(56) References Cited

U.S. PATENT DOCUMENTS

| | | | |
|---|---|---|---|
| 5,521,965 A * | 5/1996 | D'Alessio et al. | 379/209.01 |
| 6,337,858 B1 | 1/2002 | Petty et al. | |
| 6,421,437 B1 | 7/2002 | Slutsman | |
| 6,898,274 B1 * | 5/2005 | Galt et al. | 379/211.02 |
| 7,136,473 B2 | 11/2006 | Gruchala et al. | |
| 7,194,080 B2 * | 3/2007 | Worsham et al. | 379/211.03 |
| 2001/0044309 A1 | 11/2001 | Bar et al. | |
| 2006/0177030 A1 * | 8/2006 | Rajagopalan et al. | 379/142.07 |
| 2007/0064909 A1 * | 3/2007 | Levy et al. | 379/211.03 |
| 2008/0192655 A1 * | 8/2008 | Vagelos | 370/259 |
| 2010/0040215 A1 * | 2/2010 | Gupta et al. | 379/142.07 |

* cited by examiner

*Primary Examiner* — Fan Tsang
*Assistant Examiner* — Van D Huynh

(57) ABSTRACT

A device receives information associated with a calling party, validates the calling party for an originating locator service based on the calling party information, and sends an instruction to play an announcement requesting information associated with a called party. The device also receives the called party information from the calling party in response to the announcement, and retrieves called party destination information based on the called party information. The device then sends an instruction to originate a sequence of calls to the called party based on the called party destination information.

21 Claims, 18 Drawing Sheets

---

1000

| ProfileName: John | ProfileID: 01 | | | | | |
|---|---|---|---|---|---|---|
| Day/Week | Time | Phone Number n=1 | ... | Phone Number n=N | No Answer Condition | Busy Condition |
| Mon. - Fri. | 9:00-16:00 | NPA-NXX-XXXY (Work number) | ... | NPA-NXX-XXXX (Cell number) | Voice mail | Continue |
| Mon. - Fri. | 16:01-23:00 | NPA-NXX-XXYX (Home number) | ... | NPA-NXX-XXXY (Work number) | Email | Voice mail |
| Sat. - Sun. | All Day | NPA-NXX-XXXX (Cell number) | ... | NPA-NXX-XXYY (Mom's number) | Text Message | |
| | | NPA-NXX-XXXX (Cell number) | ... | NPA-NXX-XXYX (Home number) | | |

| ProfileName: John | ProfileID: 01 | | | | | |
|---|---|---|---|---|---|---|
| Day/Week | Time | Phone Number n=1 | ... | Phone Number n=N | No Answer Condition | Busy Condition |
| Mon. - Fri. | 9:00-16:00 | NPA-NXX-XXXY (Work number) | ... | NPA-NXX-XXXX (Cell number) | Voice mail | Continue |
| Mon. - Fri. | 16:01-23:00 | NPA-NXX-XXYX (Home number) | ... | NPA-NXX-XXXY (Work number) | Email | Voice mail |
| Sat. - Sun. | All Day | NPA-NXX-XXXX (Cell number) | ... | NPA-NXX-XXYY (Mom's number) | Text Message | |
| | | NPA-NXX-XXXX (Cell number) | ... | NPA-NXX-XXYX (Home number) | | |

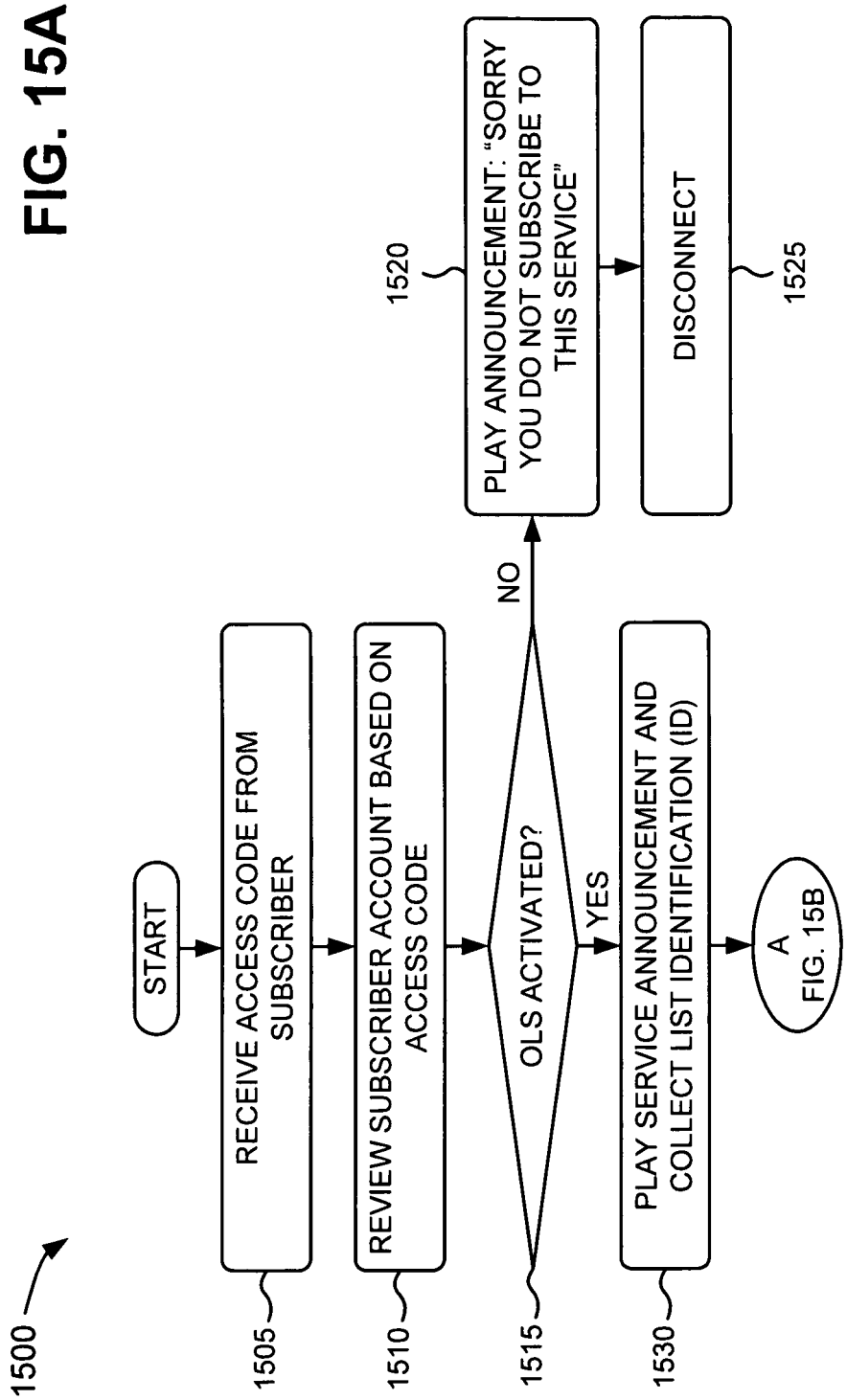

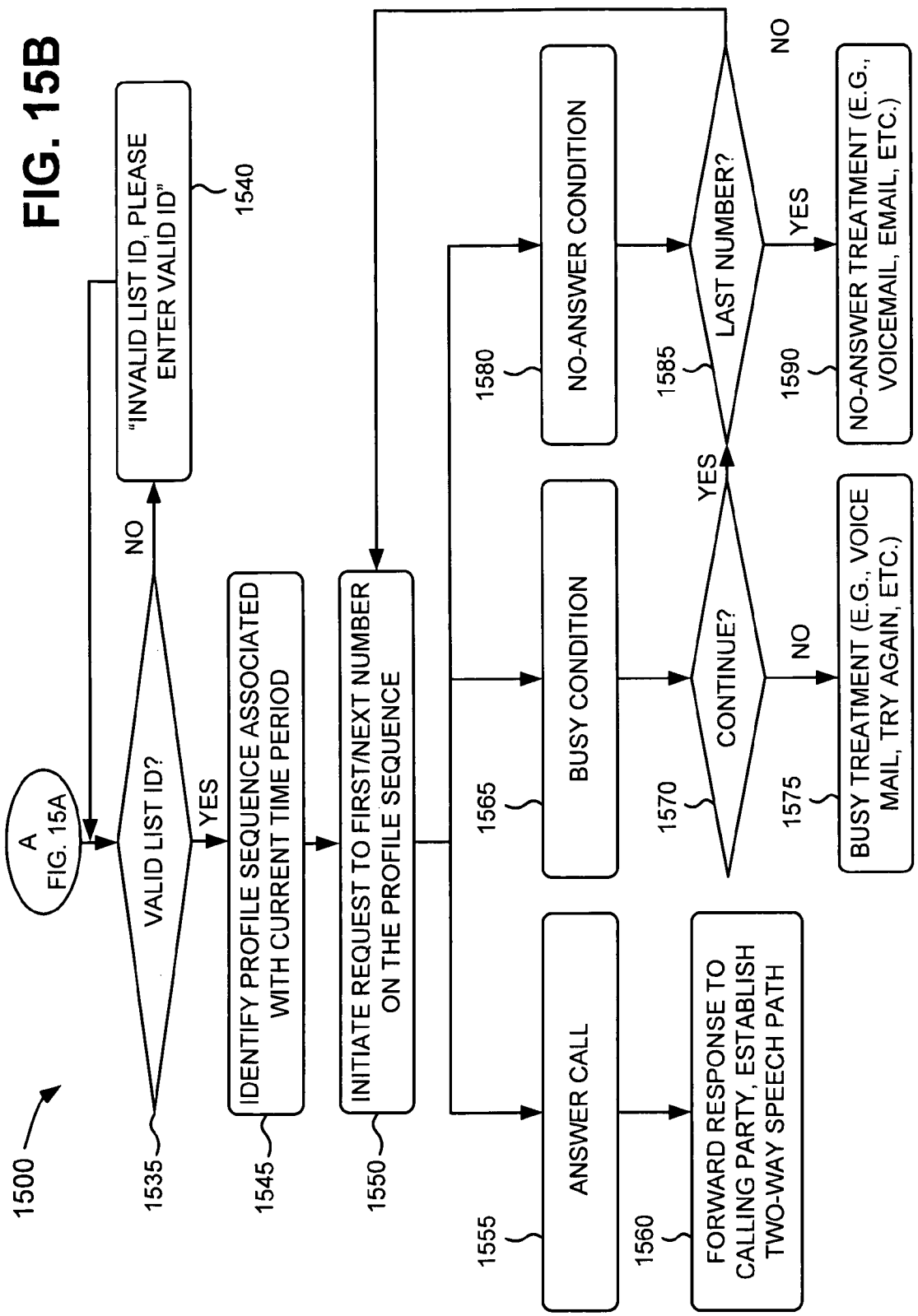

ORIGINATING LOCATOR SERVICE

BACKGROUND

Many people today have more than one telephone number where they can be reached, such as a home number, a cell number, a work number, etc. In order to reach a person, a caller sometimes has to make multiple calls. For example, a calling party may make an unsuccessful attempt to reach a called party at their home number (e.g., the call is not answered or the number is busy), and may then try to reach the called party at their cellular number. If the attempt to reach the called party via the cellular number is unsuccessful, the calling party may try to reach the called party at their work number. Such a process can be frustrating, time consuming, and costly for the calling party.

Sometimes a called party may use a locating service at the terminating end of a call to define how a received call will be handled. For example, a subscriber to a locating service may have calls to a home number ring first and then, if unanswered, the call can be forwarded to a cell number. However, such services are available only for call recipients (e.g., terminating services).

BRIEF DESCRIPTION OF THE DRAWINGS

FIGS. 11-15B illustrate flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
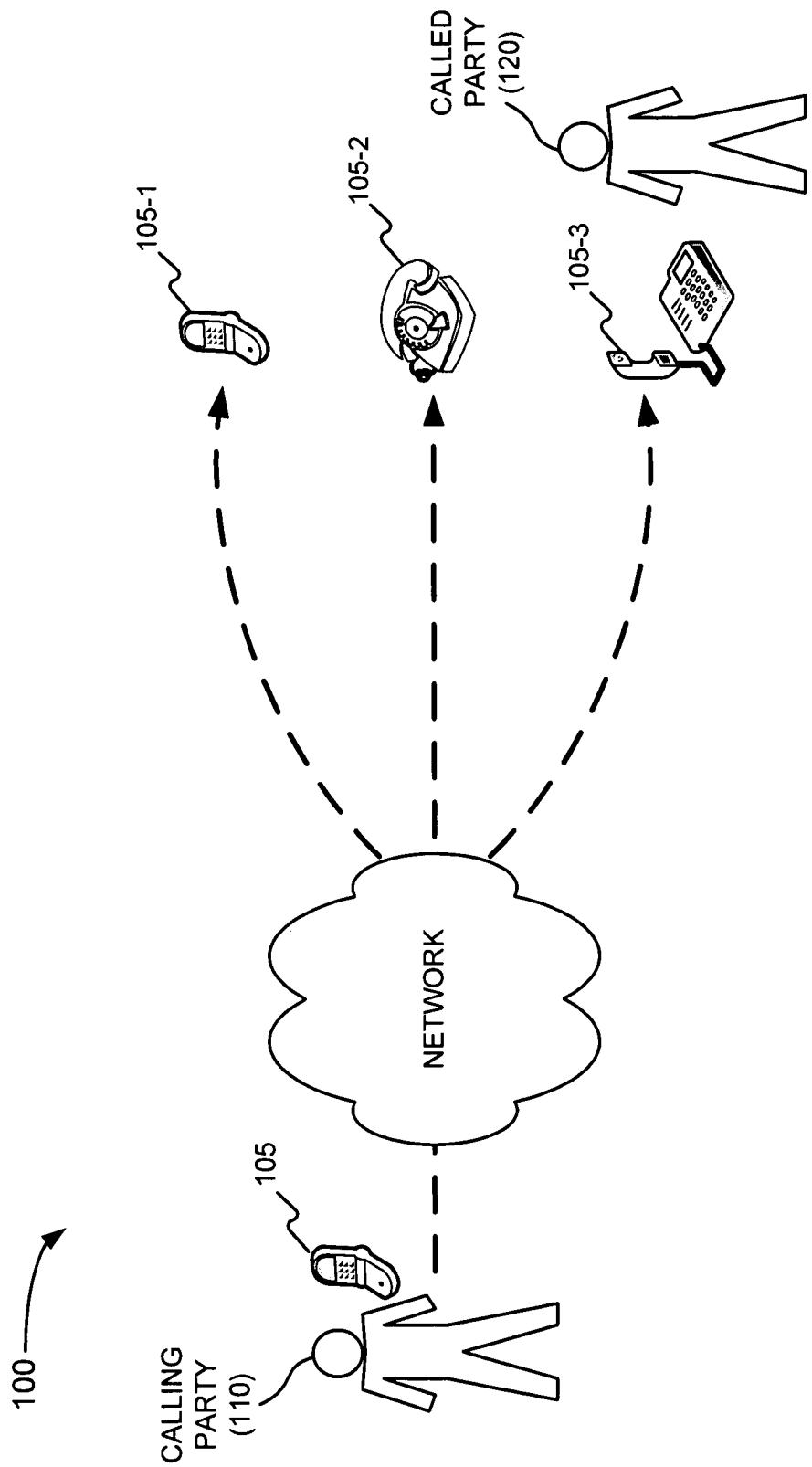
FIG. 1 provides an overview of an environment in which concepts described herein may be implemented.

Implementations described herein may provide an originating locator service that may sequentially conduct multiple call attempts for a calling party or subscriber in order to locate a person with more than one telephone number. FIG. 1 provides an overview of an environment 100 in which concepts described herein may be implemented. The originating locator service may aid a calling party 110 that has multiple contact telephone numbers for a called party 120 (e.g., a home telephone number, a cellular telephone number, a work telephone number, etc.). Each contact telephone number (including a telephone number for calling party 110) may be associated with one or more user devices 105, 105-1, 105-2, and 105-3 (collectively referred to as "user devices 105"). The originating locator service may include an originating telephone feature that enables the calling party 110 to automatically call multiple telephone numbers (e.g., telephone numbers associated with user devices 105-1, 105-2, and 105-3) in sequence and to connect to a first destination (e.g., a called telephone number) that answers the call.

The originating locator service may permit calling party 110 to create a profile with one or more lists (or sequences) of telephone numbers, and to assign a profile name and an identifier (e.g., a two-digit profile identification number) to each profile. In one implementation, each list of telephone numbers within a profile may be associated with a particular time period (e.g., business hours, weekends, evenings, lunch times, etc.), such that different calling sequences may be used at different time periods. Using a telephone keypad or a web-based user interface, calling party 110 may manage the profile and update the telephone number lists at any time. Calling party 110 may also have the option of defining different treatments for "no-answer" and/or "busy" conditions for each list. Exemplary treatments may include leaving a voice mail message, sending an email to one or more email addresses, sending a text message to a data device (e.g., a cell phone, a personal digital assistant (PDA), etc.), trying the call again in a determined amount of time (e.g., "X" minutes), etc.

The originating locator service may permit the calling party to initiate a sequence of calls using one of the telephone number lists by entering an access code and the profile identification number (e.g., with a telephone), or by selecting a profile name (e.g. via a web-based interface). The originating locator service may be implemented via a PSTN network (e.g., using an Advanced Intelligent Network (AIN) platform), a voice over Internet Protocol (VoIP) network, and/or a cellular network (e.g., wireless Global System for Mobile Communications (GSM), wireless Code-Division Multiple Access (CDMA), etc.). In contrast to existing terminating services (i.e., initiated by a called party, such as called party 120), the originating locator service may include an originating service (i.e., initiated by a calling party, such as calling party 110) that may permit the calling party to control which telephones (e.g., user devices 105-1, 105-2, and 105-3) will be called and in what order, and may make it easy to reach a desired person with one call instead of multiple calls.

Figure 2:
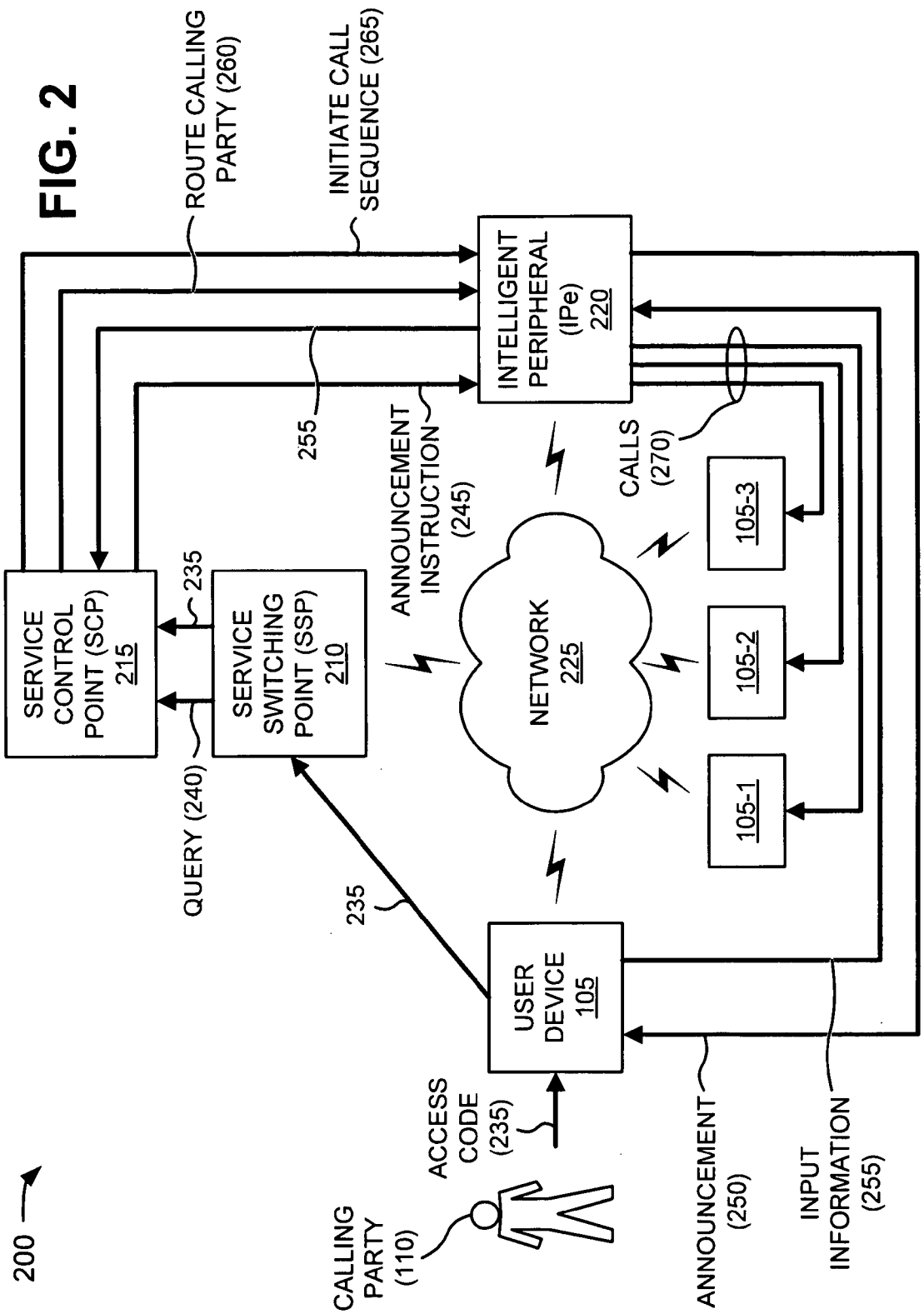
FIG. 2 is a diagram of an exemplary network in which systems and methods described herein may be implemented.

FIG. 2 is an exemplary diagram of a network 200 in which systems and methods described herein may be implemented. As illustrated, network 200 may include one or more user devices 105, 105-1, 105-2, and 105-3, a service switching point (SSP) 210, a service control point (SCP) 215, and/or an intelligent peripheral 220 interconnected by a network 225. In one implementation, network 200 may correspond to an Advanced Intelligent Network (AIN) configuration. User devices 105, SSP 210, SCP 215, and/or intelligent peripheral 220 may connect to network 225 via wired and/or wireless connections. Four user devices, a single SSP, a single SCP, a single intelligent peripheral, and a single network have been illustrated in FIG. 2 for simplicity. In practice, there may be more or less user devices, SSPs, SCPs, intelligent peripherals, and/or networks. Also, in some instances, one or more of user devices 105, SSP 210, SCP 215, and/or intelligent peripheral 220 may perform one or more functions described as being performed by another one or more of user devices 105, SSP 210, SCP 215, and/or intelligent peripheral 220.

Each of user devices 105 may include a Plain Old Telephone Service (POTS) telephone, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, or another type of computation or communication device. In one implementation, user device 105 may be associated with a calling party 110 (e.g., a subscriber to the originating locator service described herein), and may provide an originating telephone feature that enables calling party 110 to call multiple telephone numbers in a particular sequence and to connect to a first destination (e.g., called telephone number) that answers the call.

SSP 210 may include one or more computation or communication devices (e.g., a telephone exchange) that may initially respond to a call (e.g., when a calling party dials a number) by sending a query to a central database contained within SCP 215 so that the call can be handled. In one implementation, SSP 210 may use Signaling System 7 (SS7) protocols for call setup, call management, and/or call termination with other SSPs. SSP 210 may include software logic that permits it to suspend a call and launch a query to an external database (e.g., a database provided in SCP 215).

SCP 215 may include one or more computation or communication devices, provided in an intelligent network telephone system (e.g., network 200), which may be used to control a service. SCP 215 may be deployed using SS7, Sigtran, and/or Session Initiation Protocol (SIP) technologies. SCP 215 may communicate with intelligent peripheral 220 (e.g., to play voice messages and/or to prompt a calling party for information, such as prepaid long distance account codes). SCP 215 may prompt a calling party by requesting feature codes (e.g., an account code), and may use the feature codes to implement the originating locator service described herein. In one implementation, SCP 215 may include software logic that provides the originating locator service described herein, and/or a database of subscriber records and/or data. Further details of SCP 215 are provided below in connection with FIG. 3.

Intelligent peripheral 220 may include one or more computation or communication devices that may provide resources such as customized and/or concatenated voice announcements, voice recognition, and/or dual-tone multi-frequencies (DTMF) digit collection. In one implementation, intelligent peripheral 220 may include a switching matrix to connect users to these resources. Intelligent peripheral 220 may support flexible information interactions between an end user and a network (e.g., network 200). Intelligent peripheral 220 may include resource management capabilities that search for idle resources, initiate those resources, and/or return the resources to their idle state. Further details of intelligent peripheral 220 are provided below in connection with FIG. 4.

Network 225 may include an Advanced Intelligent Network (AIN) (e.g., a telephone network architecture that may separate service logic from switching equipment, and may allow new services to be added without having to redesign switches to support the new services), a local area network (LAN), a wide area network (WAN), a metropolitan area network (MAN), an intranet, the Internet, a Public Land Mobile Network (PLMN), a telephone network, such as the PSTN or a cellular telephone network, or a combination of networks. In one exemplary implementation, the originating locator service described herein may be implemented using an AIN-based platform provided on a PSTN network.

As further shown in FIG. 2, to originate a sequence of calls with the originating locator service, calling party 110 may input an access code 235 (or use some other verification mechanism, such as voice recognition) via his/her user device 105. User device 105 may provide access code 235 to SSP 210, and SSP 210 may suspend call processing and may generate a query 240 based on access code 235. SSP 210 may provide access code 235 and/or query 240 to SCP 215 for execution. SCP 215 may receive access code 235 and/or query 240, and may execute query 240 on a database of subscriber records to verify or validate that calling party 110 subscribes to the originating locator service. For example, in one implementation, the database of subscriber records may include a list of access codes for subscribers to the originating locator service. If access code 235 matches an access code provided in the list of access codes, SCP 215 may retrieve records associated with calling party 110. For example, SCP 215 may retrieve a calling party database that includes names of people that may be called by calling party 110 using the originating locator service, identifiers associated with the names, multiple telephone numbers associated with the names, "no-answer" conditions associated with the multiple telephone numbers, "busy" conditions associated with the multiple telephone numbers, etc. Further details of the calling party database are provided below in connection with FIGS. 10A and 10B.

As further shown in FIG. 2, SCP 215 may provide an instruction 245 to intelligent peripheral 220 to play an announcement that may prompt calling party 110 to input an identifier (e.g., a list identification number) for a person or group that calling party 110 wishes to contact using the originating locator service. In response, intelligent peripheral 220 may play an announcement 250 (e.g., requesting an identifier) for calling party 110 (e.g., via user device 105), and calling party 110 may provide input information 255 (e.g., a list identification) to intelligent peripheral 220 (e.g., via user device 105). Intelligent peripheral 220 may provide input information 255 to SCP 215. If calling party 110 enters a valid list identification 255 (e.g., via user device 105), SCP 215 may route calling party 110 to intelligent peripheral 220, as indicated by reference number 260, and may provide an instruction 265 to intelligent peripheral 220 to initiate calls in sequence to each telephone number associated with input information 255. For example, if calling party 110 enters input information 255 associated with a friend named John, SCP 215 may provide instruction 265 to intelligent peripheral 220 to initiate a sequence of calls to John's work telephone number, home telephone number, and cell telephone number (e.g., in the order previously instructed by the calling party).

As shown in FIG. 2, intelligent peripheral 220 may originate a sequence of calls 270 to multiple destinations (e.g., user devices 105-1, 105-2, and/or 105-3) associated with input information 255. The sequence of calls may continue until a successful connection is made at one of the destinations, until the sequence is completed without an answer, or until a certain condition is achieved. For example, if the first call (e.g., to user device 105-1) in the sequence of calls 270 is not answered after a number of rings or encounter busy lines, SCP 215 may execute an action defined (e.g., in the called party database) for a "no-answer" condition or a "busy" condition. For example, in the event of a busy signal, SCP 215 may forward the call to voice mail. In the event that the call to user device 105-1 was not answered after a predefined number of rings, SCP 215 may proceed to call the next telephone number in the sequence associated with input information 255 (e.g., user device 105-2).

If the called party (e.g., John) answers one of user devices 105-1, 105-2, and/or 105-3, intelligent peripheral 220 may bridge calling party 110 to a destination (e.g., the answering one of user devices 105-1, 105-2, and/or 105-3) associated with the called party, and discontinue the call sequence to the remaining user devices. A connection may be established between calling party 110 and the destination (e.g., called party 120).

In one exemplary implementation, the originating locator service may be used if calling party 110 wants to reach any one person from a group of several people. For example, a person may have a group of fungible service providers. The person may define a list (e.g., "Taxi Providers" list) within the database of subscriber records. If there is a need to obtain a taxi, the person may use the originating locator service to call his/her list of taxi providers in sequence, and may connect to the first taxi service who answers the call. In another example, a person may have a list of emergency contacts and may create a list with his/her contacts' telephone numbers arranged in sequence from primary contact to secondary contact(s). The person may reach the first available contact in the sequence using one call with the originating locator service. In another example, a calling sequence may include multiple numbers for a primary contact, followed by multiple numbers for one or more secondary contacts.

Figure 3:
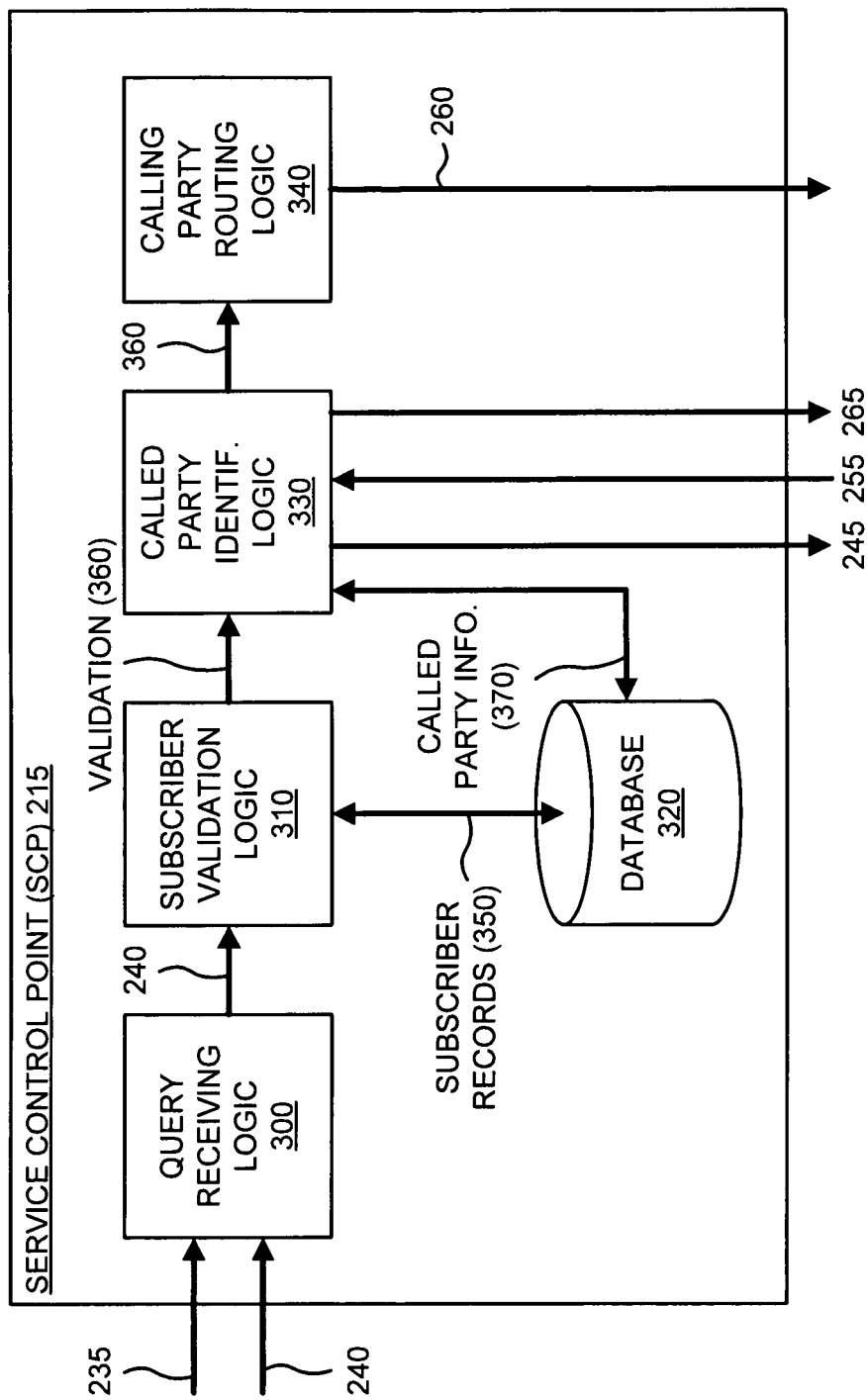
FIG. 3 depicts a functional block diagram of an exemplary service control point of the network illustrated in FIG. 2.

FIG. 3 depicts an exemplary functional block diagram of SCP 215. As illustrated, SCP 215 may include query receiving logic 300, subscriber validation logic 310, a database 320, called party identification logic 330, and/or calling party routing logic 340.

Query receiving logic 300 may include hardware or a combination of hardware and software that enables SCP 215 to receive access code 235 and/or query 240 from SSP 210, and to execute query 240 on a database of subscriber records. In one implementation, query receiving logic 300 may receive access code 235 and query 240, and may provide query 240 to subscriber validation logic 310 for execution on database 320.

Subscriber validation logic 310 may include hardware or a combination of hardware and software that enables SCP 215 to execute query 240 on a database of subscriber records (e.g., database 320) to verify or validate that calling party 110 subscribes to the originating locator service. In one implementation, subscriber validation logic 310 may receive query 240 from query receiving logic 300, and may execute query 240 on subscriber records 350 (e.g., a list of access codes for subscribers to the originating locator service) provided in database 320 in order to validate that calling party subscribes to the originating locator service. If access code 235 matches an access code provided in the list of access codes, subscriber validation logic 310 may determine that calling party 110 is validated, and may provide a validation 360 of calling party 110 to called party identification logic 330.

Database 320 may include one or more databases capable of being provided in SCP 215 (e.g., within a storage device) and/or managed by SCP 215. In one implementation, database 320 may be provided in a device separate from SCP 215, and may be accessed by SCP 215. The information provided in database 320 may be provided by any device in network 200, and/or by any device provided in a network separate from network 200. Database 320 may include a variety of information, such as subscriber records used to verify or validate that calling party 110 subscribes to the originating locator service, a list of access codes for subscribers to the originating locator service, names of people who may be called by calling party 110 using the originating locator service, identifiers associated with the names, multiple telephone numbers associated with the names, "no-answer" conditions associated with the names (e.g., an action to take if a call is not answered), "busy" conditions associated with the names (e.g., an action to take if a call to a particular destination result in a busy signal), etc.

Called party identification logic 330 may include hardware or a combination of hardware and software that enables SCP 215 to retrieve records associated with calling party 110. In one implementation, called party identification logic 330 may receive validation 360, and may retrieve called party information 370 (e.g., names of people that may be called by calling party 110 using the originating locator service, identifiers associated with the names, multiple telephone numbers associated with the names, "no-answer" conditions associated with the names, "busy" conditions associated with the names, etc.) from database 320. Called party identification logic 330 may provide announcement instruction 245 to intelligent peripheral 220, and may receive input information 255 (e.g., a list identification) from intelligent peripheral 220. If calling party 110 enters a valid list identification 255, called party identification logic 330 may provide instruction 265 to intelligent peripheral 220 to initiate a sequence of calls to each telephone number associated with input information 255. Called party identification logic 330 may provide validation 360 to calling party routing logic 340.

Calling party routing logic 340 may include hardware or a combination of hardware and software that enables SCP 215 to route calling party 110 to intelligent peripheral 220. In one implementation, calling party routing logic 340 may receive validation 260 from called party identification logic 230. If calling party 110 enters a valid list identification 255, calling party routing logic 340 may route calling party 110 to intelligent peripheral 220, as indicated by reference number 260.

Although FIG. 3 shows exemplary functional components of SCP 215, in other implementations, SCP 215 may contain fewer, different, differently arranged, or additional functional components than depicted in FIG. 3. In still other implementations, one or more functional components of SCP 215 may perform one or more other tasks described as being performed by one or more other functional components of SCP 215.

Figure 4:
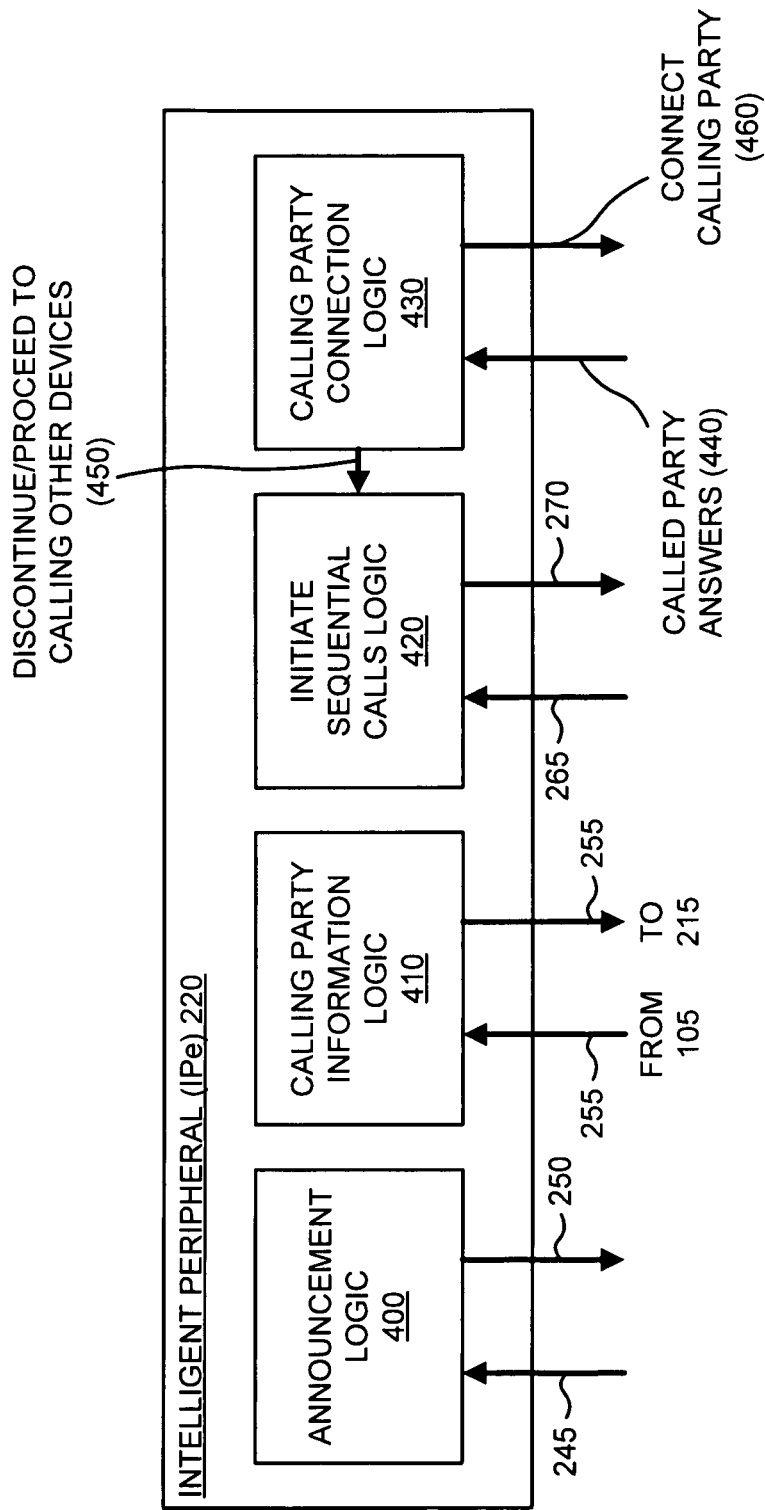
FIG. 4 illustrates a functional block diagram of an exemplary intelligent peripheral of the network depicted in FIG. 2.

FIG. 4 illustrates a functional block diagram of intelligent peripheral 220. As illustrated, intelligent peripheral 220 may include announcement logic 400, calling party information logic 410, initiate sequential calls logic 420, and/or calling party connection logic 430.

Announcement logic 400 may include hardware or a combination of hardware and software that enables intelligent peripheral 220 to play an announcement that may prompt calling party 110 to input an identifier (e.g., a two-digit list identification) for a person or group that calling party 110 wishes to contact with the originating locator service. In one implementation, announcement logic 400 may receive instruction 245 (e.g. from SCP 215) to play an announcement that may prompt calling party 110 to input an identifier for a person or group calling party 110 wishes to contact with the originating locator service. In response, announcement logic 400 may play announcement 250 (e.g., requesting an identifier) for calling party 110 (e.g., via user device 105).

Calling party information logic 410 may include hardware or a combination of hardware and software that enables intelligent peripheral 220 to provide input information 255 (e.g., in response to announcement 250) to SCP 215. In one implementation, calling party information logic 410 may receive input information 255 (e.g., a list identification) from user device 105 (e.g., in response to announcement 250), and may provide input information 255 to SCP 215.

Initiate sequential calls logic 420 may include hardware or a combination of hardware and software that enables intelligent peripheral 220 to initiate sequential calls 270 to multiple destinations associated with input information 255. In one implementation, initiate sequential calls logic 420 may receive instruction 265 to initiate calls in sequence to multiple destinations, and may initiate sequential calls 270 to multiple destinations (e.g., user devices 105-1, 105-2, and/or 105-3) associated with input information 255.

Calling party connection logic 430 may include hardware or a combination of hardware and software that enables intelligent peripheral 220 to connect calling party 110 to a destination answering one of the calls in the sequence of calls. In one implementation, if the called party answers one of user devices 105-1, 105-2, and/or 105-3 (e.g., as indicated by reference number 440), calling party connection logic 430 may receive indication 440 that the called party answered, and may discontinue the calling sequence to the other user devices (e.g., the remaining of user devices 105-1, 105-2, and/or 105-3), as indicated by reference number 450. Calling party connection logic 430 may bridge calling party 110 to a destination (e.g., the answering one of user devices 105-1, 105-2, and/or 105-3) associated with the called party (e.g., as indicated by reference number 460), and a connection may be established between calling party 110 and the destination (e.g., the called party). However, if there is no answer for the first call in the sequence of calls, calling party connection logic 430 may provide indication to proceed calling other numbers in the sequence of calls (e.g., as indicated by reference number 440).

Although FIG. 4 shows exemplary functional components of intelligent peripheral 220, in other implementations, intelligent peripheral 220 may contain fewer, different, differently arranged, or additional functional components than depicted in FIG. 4. In still other implementations, one or more functional components of intelligent peripheral 220 may perform one or more other tasks described as being performed by one or more other functional components of intelligent peripheral 220.

Figure 5:
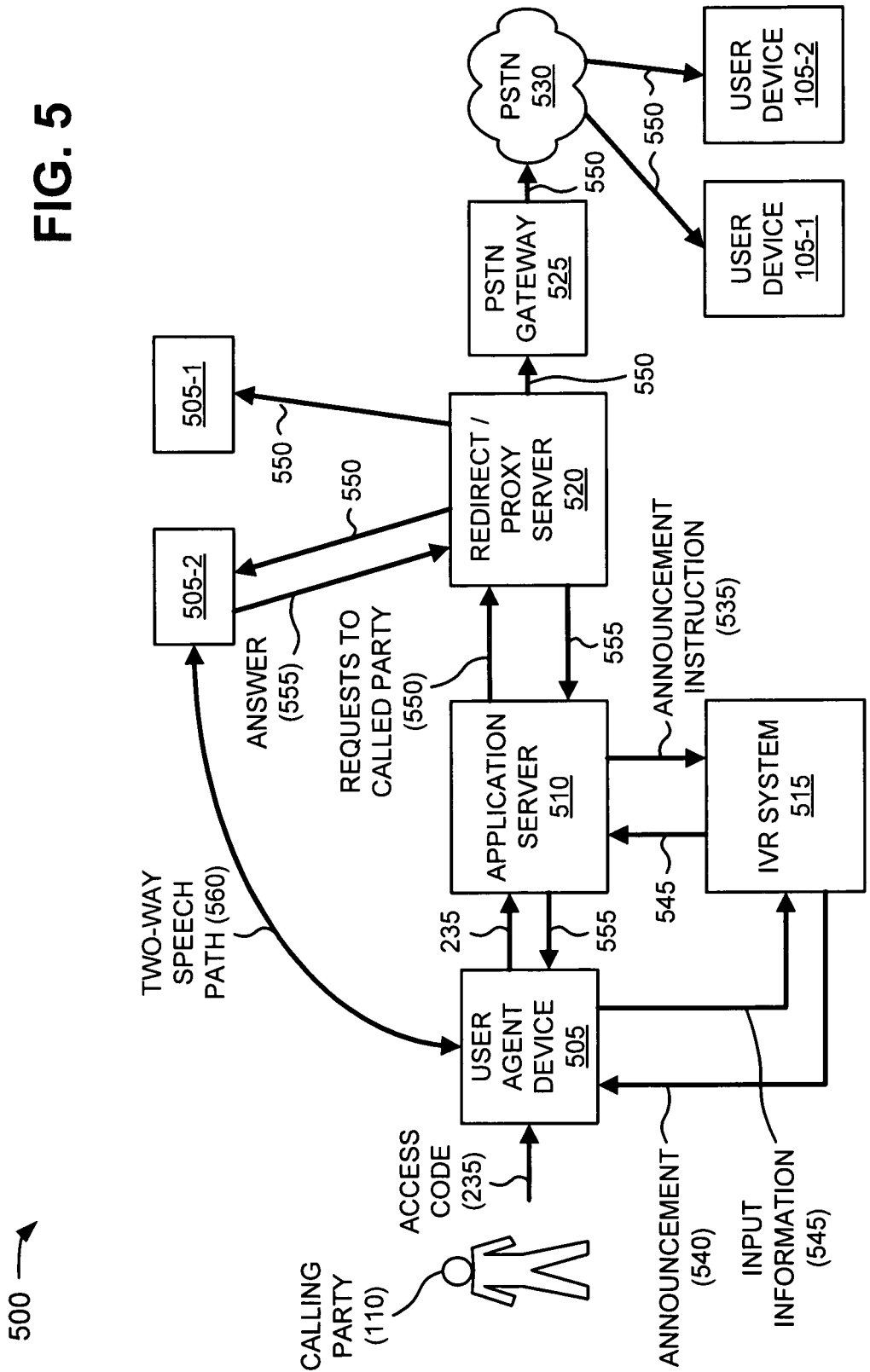
FIG. 5 is a diagram of another exemplary network in which systems and methods described herein may be implemented.

FIG. 5 is a diagram of another exemplary network 500 in which systems and methods described herein may be implemented. As illustrated, network 500 may include one or more user devices 105-1 and 105-2, one or more user agent devices 505, 505-1, and 505-2 (collectively referred to as "user agent devices 505"), a application server 510, an interactive voice response (IVR) system 515, a redirect and/or proxy server 520, a PSTN gateway 525, and/or a PSTN network 530. In one implementation, network 500 may correspond to a VoIP configuration (e.g., implemented with session initiation protocol (SIP), International Telecommunication Union (ITU) H.323 protocol, etc.). Although not shown in FIG. 5, one or more components of network 500 may be interconnected by a network (e.g., a LAN, a WAN, a MAN, an intranet, the Internet, a PLMN, a cellular telephone network, or a combination of networks). User devices 105, user agent devices 505, application server 510, IVR system 515, redirect/proxy server 520, PSTN gateway 525, and/or PSTN network 530 may connect to the network (not shown) via wired and/or wireless connections. Two user devices, three user agent devices, a single application server, a single IVR system, a single redirect/proxy server, a single PSTN gateway, and a single PSTN network have been illustrated in FIG. 5 for simplicity. In practice, there may be more or fewer user devices, user agent devices, application servers, IVR systems, redirect/proxy servers, PSTN gateways, and/or PSTN networks. Also, in some instances, one or more of user devices 105, user agent devices 505, application server 510, IVR system 515, redirect/proxy server 520, and/or PSTN gateway 525 may perform one or more functions described as being performed by another one or more of user devices 105, user agent devices 505, application server 510, IVR system 515, redirect/proxy server 520, and/or PSTN gateway 525. Each of user devices 105 may include the configurations and functions described above in connection with FIG. 2.

Each of user agent devices 505 may include a logical entity that may create a new request (e.g., a SIP request), and may send the request. For example, each of user agent devices 505 may include a radiotelephone, a PCS terminal, a PDA, a laptop, a personal computer, a VoIP-based device, or another type of computation or communication device. In one implementation, user agent device 505 may be associated with calling party 110 (e.g., a subscriber to the originating locator service described herein), and may provide an originating telephone feature that enables calling party 110 to automatically call multiple telephone numbers in sequence and to connect to a first destination (e.g., called telephone number) in the sequence that answers the call.

Application server 510 may include one or more computation or communication devices that act as a user agent to both ends of a SIP call. In one implementation, application server 510 may communicate with IVR system 515 (e.g., to play voice messages and/or to prompt a calling party for information). Application server 510 may prompt a calling party (e.g., via IVR system 515) by requesting feature codes (e.g., an account code or an access code), and may use the feature codes to implement the originating locator service described herein. Application server 510 may include software logic that provides the originating locator service described herein, and/or a database of subscriber records and/or data. Further details of application server 510 are provided below in connection with FIG. 6.

IVR system 515 may include one or more computation or communication devices that may allow a user, typically a telephone caller, to select an option from a voice menu or otherwise interface with a computer system. IVR system 515 may play pre-recorded voice prompts to which the user may respond by either pressing a number on a telephone keypad or by speaking a response. In one implementation, IVR system 515 may playback announcements (e.g., if certain conditions are encountered) to prompt calling party 110 to provide requested information. Further details of IVR system 515 are provided below in connection with FIG. 7.

Redirect/proxy server 520 may include one or more redirect servers that may generate responses to requests (e.g., SIP requests), and may direct the requests to an alternative set of Uniform Resource Identifiers (URIs). Alternatively and/or additionally, redirect/proxy server 520 may include one or more proxy servers that may act as a server and a client for purposes of making request on behalf of other clients, and may route requests (e.g., SIP requests) to another entity closer to a targeted user. In one implementation, redirect/proxy server 520 may forward called party requests in a particular sequence to multiple destinations (e.g., user agent devices 505-1 and 505-2, user devices 105-1 and 105-2, etc.). Further details of redirect/proxy server 520 are provided below in connection with FIG. 8.

PSTN gateway 525 may include a network device, a data transfer device (e.g., a gateway, a router, a switch, a firewall, a network interface card (NIC), a hub, a bridge, a proxy server, or some other type of device that processes and/or transfers data), etc. In one example, PSTN gateway device 525 may be capable of converting voice and/or facsimile information, in real time, between PSTN network 530 and an IP network (e.g., a network that includes user agent device 505, application server 510, IVR system 515, and/or redirect/proxy server 520).

PSTN network 530 may include a telephone network, such as the PSTN or a cellular telephone network, or a combination of networks.

As further shown in FIG. 5, to originate a sequence of calls with the originating locator service, calling party 110 may input access code 235 (or use some other verification mechanism, such as a username and/or password) via his/her user agent device 505. In one implementation, calling party 110 may have an account (e.g., for originating locator services) that is registered with application server 510 and contains information associated with a profile of calling party 110. Application server 510 may request that user agent device 505 (e.g., associated with calling party 110) be registered in order to originate a sequence of calls.

User agent device 505 may provide access code 235 to application server 510. For example, calling party 110 may input access code 235 via a key pad of user agent device 505, and user agent device 505 may send a request to application server 510. Application server 510 may receive access code 235 and/or the request, and may determine whether the originating locator service is activated for calling party 110 based on a comparison with a database of subscriber records. For example, in one implementation, the database of subscriber records may include a list of access codes for subscribers to the originating locator service. If access code 235 matches an access code provided in the list of access codes, application server 510 may retrieve records associated with calling party 110. For example, application server 510 may retrieve a calling party database that includes names of people who may be called by calling party 110 using the originating locator service, indentifiers associated with the names, multiple telephone numbers associated with the names, "no-answer" conditions associated with the names, "busy" conditions associated with the names, etc. Further details of the calling party database are provided below in connection with FIGS. 10A and 10B.

As further shown in FIG. 5, application server 510 may provide an instruction 535 to IVR system 515 to play an announcement that may prompt calling party 110 to input an identifier (e.g., a two-digit list identification) for a person or group that calling party 110 wishes to contact with the originating locator service. IVR system 515 may play an announcement 540 (e.g., requesting an identifier) for calling party 110 (e.g., via user agent device 505), and calling party 110 may provide input information 545 (e.g., a list identification) to IVR system 515 (e.g., via user agent device 505). IVR system 515 may provide input information 545 to application server 510. If calling party 110 enters a valid list identification 545 (e.g., via user agent device 505), application server 510 may initiate a sequence of called party requests 550 to multiple destinations (e.g., user agent devices 505-1 and 505-2, user devices 105-1 and 105-2, etc.) associated with input information 545. For example, if calling party 110 enters input information 545 associated with a friend named John, application server 510 may provide called party requests 550 to redirect/proxy server 520 to initiate a call sequence to John's work telephone number, then John's home telephone number, and then John's cell telephone number.

Redirect/proxy server 520 may route called party requests 550 based on locations of termination endpoints, and may alert (or ring) the terminating endpoints (e.g., a VoIP telephone, a PC soft client, a POTS telephone, etc.). For example, redirect/proxy server 520 may sequentially receive and send called party requests 550 to user agent devices 505-1 and 505-2, and may sequentially receive and send, via PSTN gateway 525 and/or PSTN network 530, called party requests 550 to user devices 105-1 and 105-2. If the called party (e.g., John) answers one of user agent devices 505-1 and 505-2, or user devices 105-1 and 105-2, the answering destination (e.g., user agent device 505-2, as shown in FIG. 5) associated with the called party may forward an answer 555 to redirect/proxy server 520. Redirect/proxy server 520 may forward answer 555 to application server 510, and application server 510 may send answer 555 to user agent device 505. User agent device 505 may use information contained in answer 555 (e.g., an IP address associated with user agent device 505-1) to establish a two-way speech path 560 with user agent device 505-2. Upon receiving answer 555, application server 510 may discontinue the sequence of calls to any subsequent destinations in the list of numbers associated with the called party (e.g., any of user agent device 505-1 and user devices 105-1 and 105-2).

If the call sequence is completed with none of called party requests 550 being answered by user agent devices 505-1 or 505-2 or user devices 105-1 or 105-2, application server 510 may execute an action defined (e.g., in the called party database) for a "no-answer" condition or a "busy" condition. For example, application server 510 may forward the call to voice mail associated with one of the destinations if none of the calls were answered after a predefined number of rings. In another example, application server 510 may continue to ring a particular telephone number associated with input information 545 if the particular line is busy.

Figure 6:
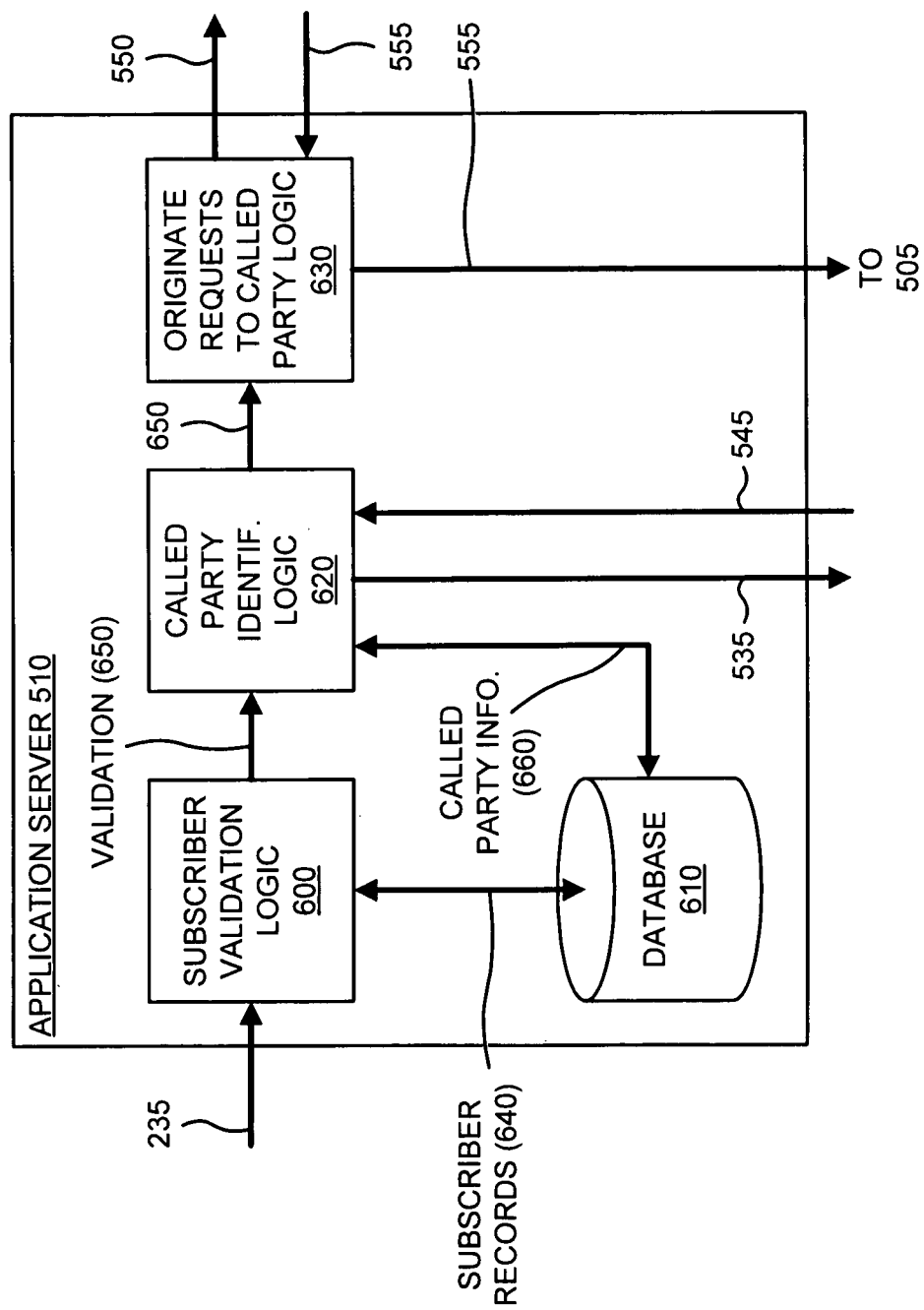
FIG. 6 depicts a functional block diagram of an exemplary application server of the network illustrated in FIG. 5.

FIG. 6 depicts a functional block diagram of an exemplary application server 510. As illustrated, application server 510 may include subscriber validation logic 600, a database 610, called party identification logic 620, and/or originate requests to called party logic 630.

Subscriber validation logic 600 may include hardware or a combination of hardware and software that enables application server 510 to compare access code 235 (or information contained in a request) to a database of subscriber records (e.g., contained in database 610) to verify or validate that calling party 110 subscribes to the originating locator service. In one implementation, subscriber validation logic 600 may receive access code 235 from user agent device 505, and may compare access code 235 to subscriber records 640 (e.g., a list of access codes for subscribers to the originating locator service) provided in database 610 in order to validate that calling party subscribes to the originating locator service. If access code 235 matches an access code provided in the list of access codes, subscriber validation logic 600 may determine that calling party 110 is validated, and may provide a validation 650 of calling party 110 to called party identification logic 620.

Database 610 may include one or more databases capable of being provided in application server 510 (e.g., within a storage device) and/or managed by application server 510. In one implementation, database 610 may be provided in a device separate from application server 510, and may be accessed by application server 510. The information provided in database 610 may be provided by any device in network 200, and/or by any device provided in a network separate from network 200. Database 610 may include a variety of information, such as subscriber records to verify or validate that calling party 110 subscribes to the originating locator service, a list of access codes for subscribers to the originating locator service, names of people who may be called by calling party 110 using the originating locator service, identifier associated with the names, multiple telephone numbers and sequences associated with the names, "no-answer" conditions associated with the names, "busy" conditions associated with the names, etc.

Called party identification logic 620 may include hardware or a combination of hardware and software that enables application server 510 to retrieve records associated with calling party 110. In one implementation, called party identification logic 620 may receive validation 650, and may retrieve called party information 660 (e.g., names of people who may be called by calling party 110 using the originating locator service, identifiers associated with the names, multiple telephone numbers and the order of the telephone numbers associated with the names, "no-answer" conditions associated with the names, "busy" conditions associated with the names, etc.) from database 610. Called party identification logic 620 may provide announcement instruction 535 to IVR system 515, and may receive input information 545 (e.g., a list identification) from IVR system 515. If calling party 110 enters a valid list identification 545, called party identification logic 620 may provide validation 650 to originate requests to called party logic 630.

Originate requests to called party logic 630 may include hardware or a combination of hardware and software that enables application server 510 to initiate sequential calls to multiple destinations associated with input information 545. In one implementation, originate requests to called party logic 630 may receive validation 550 from called party identification logic 620. If calling party 110 enters a valid list identification 545, originate requests to called party logic 630 may sequentially provide called party requests 550 to redirect/proxy server 520 to initiate calls and/or requests to multiple destinations. If the called party answers at one of the destinations, the answering destination may forward answer 555 to redirect/proxy server 520. In response, redirect/proxy server 520 may forward answer 555 to originate requests to called party logic 630, and originate requests to called party logic 630 may send answer 555 to user agent device 505.

Although FIG. 6 shows exemplary functional components of application server 510, in other implementations, application server 510 may contain fewer, different, differently arranged, or additional functional components than depicted in FIG. 6. In still other implementations, one or more functional components of application server 510 may perform one or more other tasks described as being performed by one or more other functional components of application server 510.

Figure 7:
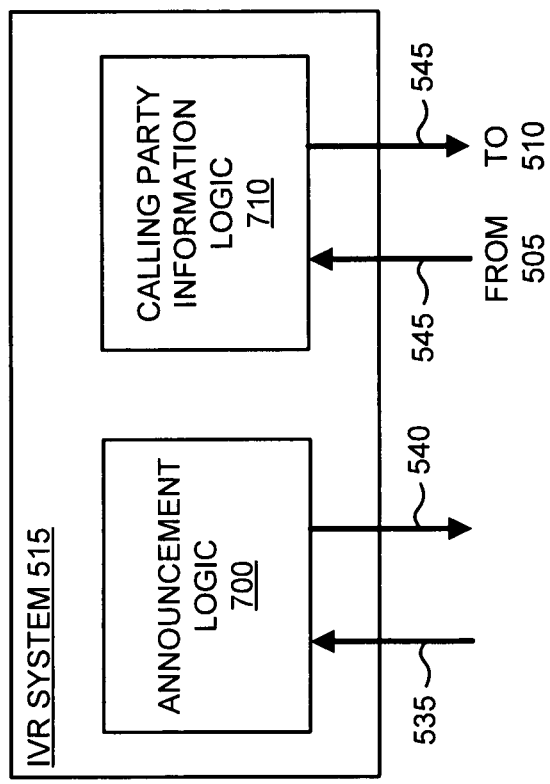
FIG. 7 illustrates a functional block diagram of an exemplary interactive voice response (IVR) system of the network depicted in FIG. 5.

FIG. 7 illustrates an exemplary functional block diagram of IVR system 515. As illustrated, IVR system 515 may include announcement logic 700 and/or calling party information logic 710.

Announcement logic 700 may include hardware or a combination of hardware and software that enables IVR system 515 to play an announcement that may prompt calling party 110 to input an identifier (e.g., a two-digit list identification) for a person or group that calling party 110 wishes to contact with the originating locator service. In one implementation, announcement logic 700 may receive instruction 535 to play an announcement that may prompt calling party 110 to input an identifier for a person or group calling party 110 wishes to contact with the originating locator service. Announcement logic 700 may play announcement 540 (e.g., requesting an identifier) for calling party 110 (e.g., via user agent device 505).

Calling party information logic 710 may include hardware or a combination of hardware and software that enables IVR system 515 to provide input information 545 (e.g., in response to announcement 540) to application server 510. In one implementation, calling party information logic 710 may receive input information 545 (e.g., a list identification) from user agent device 505 (e.g., in response to announcement 540), and may provide input information 545 to application server 510.

Although FIG. 7 shows exemplary functional components of IVR system 515, in other implementations, IVR system 515 may contain fewer, different, differently arranged, or additional functional components than depicted in FIG. 7. In still other implementations, one or more functional components of IVR system 515 may perform one or more other tasks described as being performed by one or more other functional components of IVR system 515.

Figure 8:
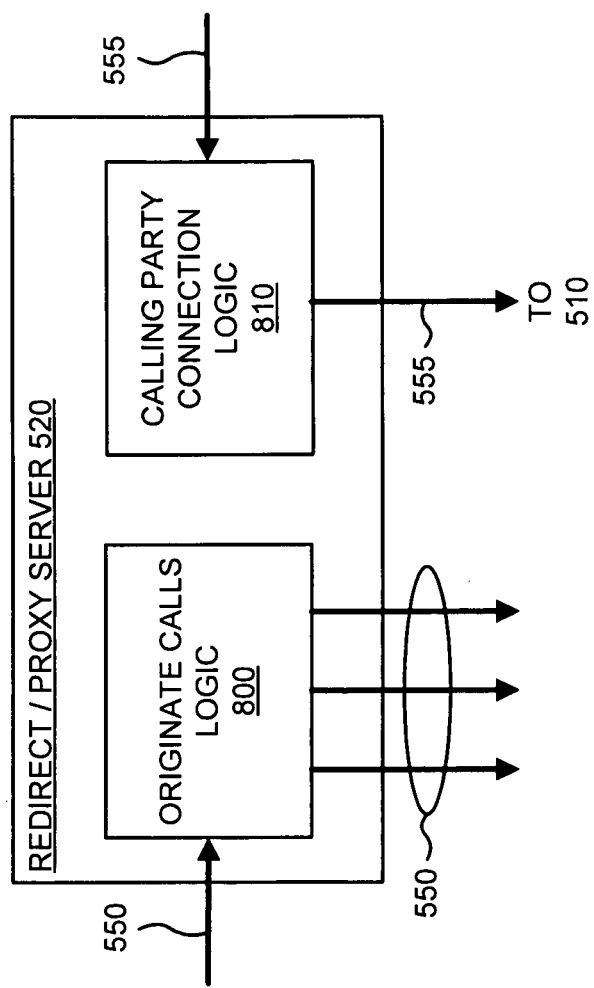
FIG. 8 depicts a functional block diagram of an exemplary redirect and/or proxy server of the network illustrated in FIG. 5.

FIG. 8 depicts an exemplary functional block diagram of redirect/proxy server 520. As illustrated, redirect/proxy server 520 may include originate calls logic 800 and/or calling party connection logic 810.

Originate calls logic 800 may include hardware or a combination of hardware and software that enables redirect/proxy server 520 to route called party requests 550 based on locations of termination endpoints, and may alert (or ring) the terminating endpoints (e.g., a VoIP telephone, a PC soft client, a POTS telephone, etc.). In one implementation, originate calls logic 800 may receive called party requests 550, and may originate called party requests 550 sequentially to multiple destinations, such as user agent devices 505-1 and 505-2, and user devices 105-1 and 105-2 (e.g. via PSTN gateway 525 and/or PSTN network 530). In another implementation, originate calls logic 800 may receive individual called party requests 550 (e.g., from application server 510) and originate the called party request 500 to a destination.

Calling party connection logic 810 may include hardware or a combination of hardware and software that enables redirect/proxy server 520 (e.g., via application server 510) to connect calling party 110 (e.g., via user agent device 505) to a destination answering one of the calls in the sequence of calls. In one implementation, if the called party answers one of user agent devices 505-1 and 505-2, and/or user devices 105-1 and 105-2, the answering destination associated with the called party may forward answer 555 to calling party connection logic 810. Calling party connection logic 810 may forward answer 555 to application server 510 so that two-way speech path 560 may be established.

Although FIG. 8 shows exemplary functional components of redirect/proxy server 520, in other implementations, redirect/proxy server 520 may contain fewer, different, differently arranged, or additional functional components than depicted in FIG. 8. In still other implementations, one or more functional components of redirect/proxy server 520 may perform one or more other tasks described as being performed by one or more other functional components of redirect/proxy server 520.

Figure 9:
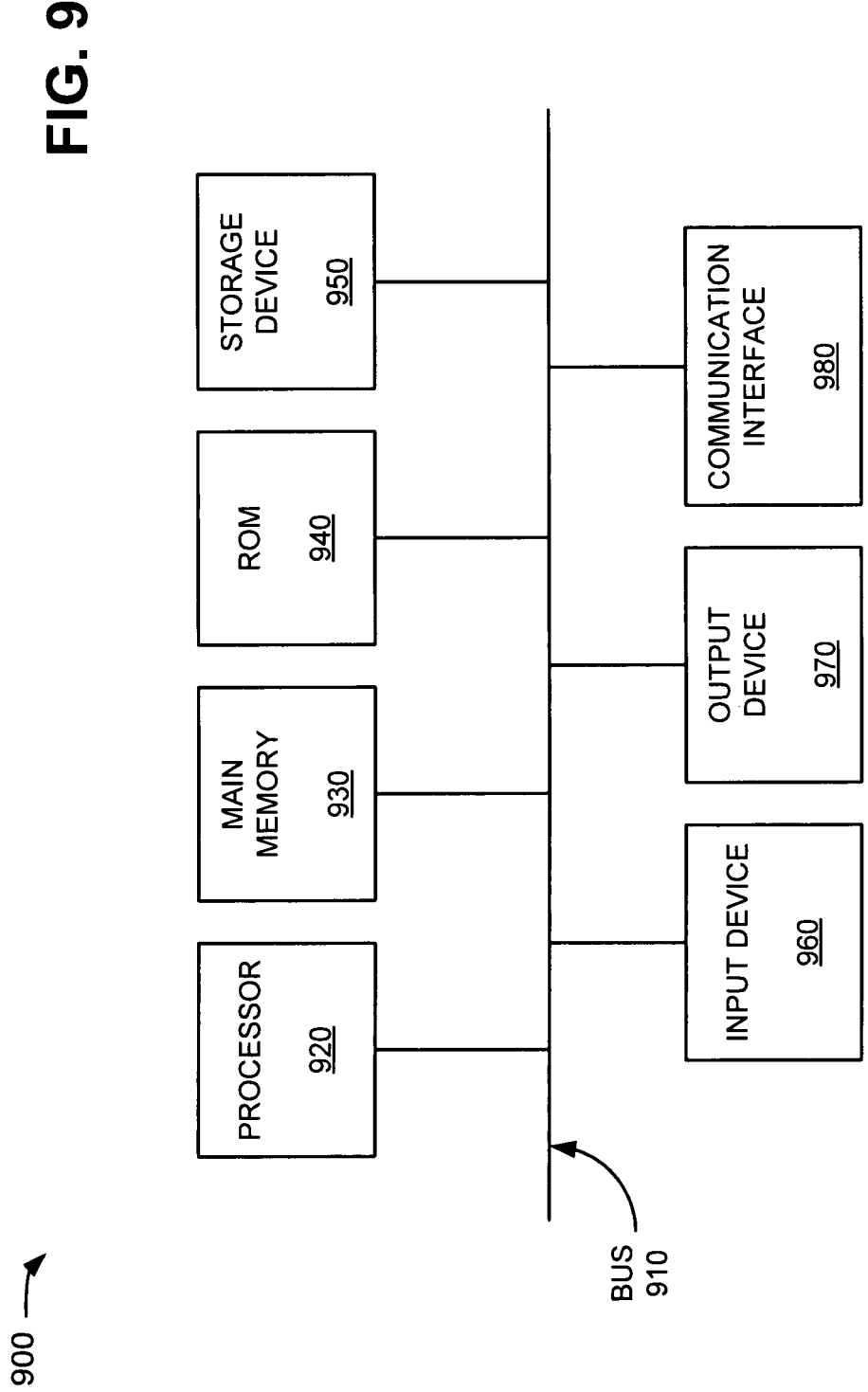
FIG. 9 illustrates exemplary components of a user device, a service switching point, the service control point, the intelligent peripheral, a user agent device, the application server, the IVR system, the redirect/proxy server, and/or a Public Switched Telephone Network (PSTN) gateway of the networks depicted in FIGS. 2 and 5.

FIG. 9 is a diagram of an exemplary device 900 that may correspond to user devices 105, SSP 210, SCP 215, intelligent peripheral 220, user agent devices 505, application server 510, IVR system 515, redirect/proxy server 520, and/or PSTN gateway 525. As illustrated, device 900 may include a bus 910, processor 920, a main memory 930, a read-only memory (ROM) 940, a storage device 950, an input device 960, an output device 970, and/or a communication interface 980. The functions described in FIGS. 2, 3, and 5-7 may be performed by one or more of the exemplary components of device 900 depicted in FIG. 9.

Bus 910 may include a path that permits communication among the components of device 900. Processor 920 may include a processor, a microprocessor, or another type of processing unit that may interpret and execute instructions.

Main memory 930 may include a random access memory (RAM) or another type of dynamic storage device that may store information and instructions for execution by processor 920. ROM 940 may include a ROM device or another type of static storage device that may store static information and/or instructions for use by processor 920. Storage device 950 may include a magnetic and/or optical recording medium and its corresponding drive.

Input device 960 may include a mechanism that permits an operator to input information to device 900, such as a keyboard, a mouse, a pen, a microphone, a touch screen, voice recognition and/or biometric mechanisms, etc. Output device 970 may include a mechanism that outputs information to the operator, including a display, a printer, a speaker, etc. Communication interface 980 may include any transceiver-like mechanism that enables device 900 to communicate with other devices and/or systems. For example, communication interface 980 may include mechanisms for communicating with another device or system via a network, such as networks 200 and/or 500.

As described herein, device 900 may perform certain operations in response to processor 920 executing software instructions contained in a computer-readable medium, such as main memory 930. A computer-readable medium may be defined as a physical or logical memory device. A logical memory device may include memory space within a single physical memory device or spread across multiple physical memory devices. The software instructions may be read into main memory 930 from another computer-readable medium, such as storage device 950, or from another device via communication interface 980. The software instructions contained in main memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Although FIG. 9 shows exemplary components of device 900, in other implementations, device 900 may contain fewer, different, differently arranged, or additional components than depicted in FIG. 9. In still other implementations, one or more components of device 900 may perform one or more other tasks described as being performed by one or more other components of device 900.

Figure 10:
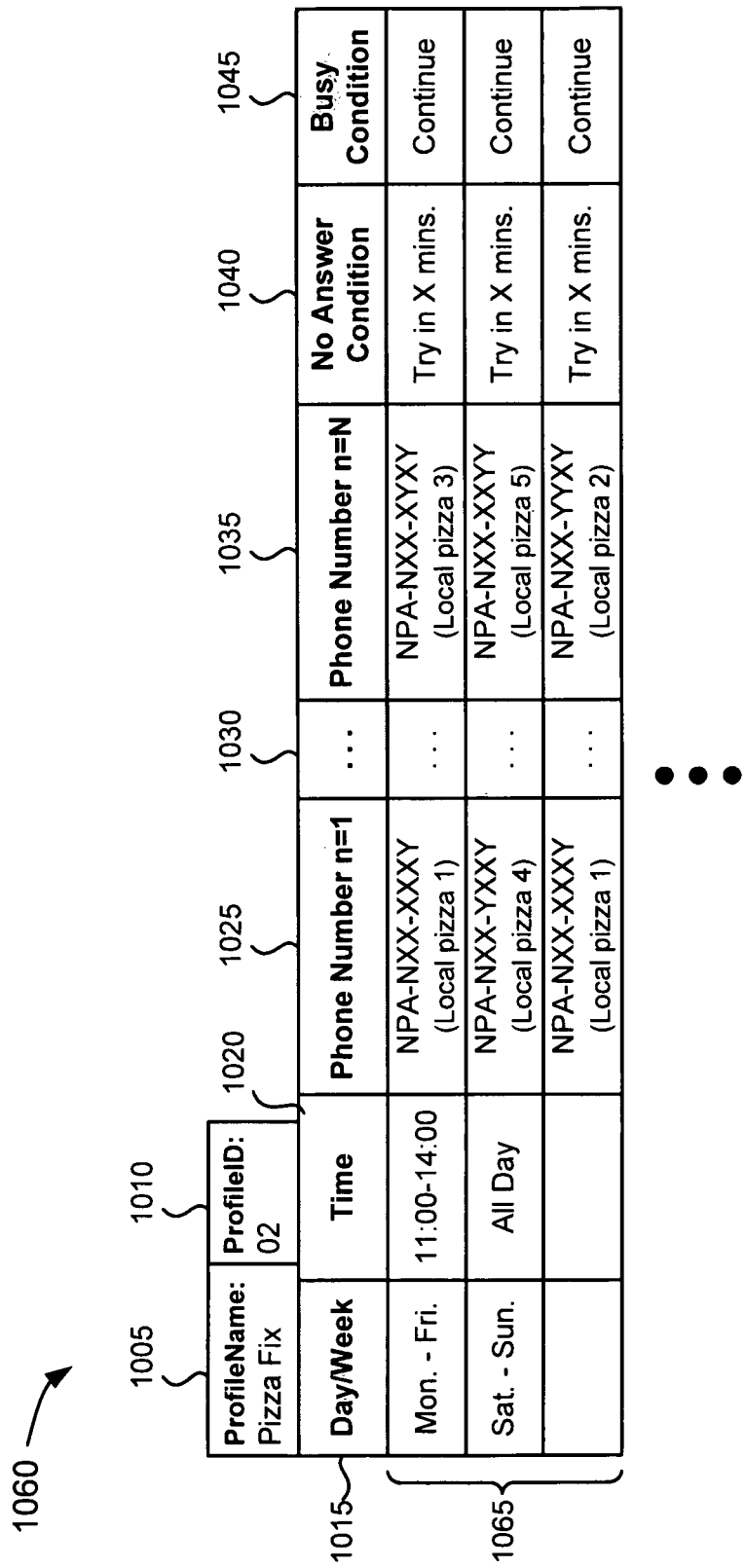
FIGS. 10A and 10B depict portions of an exemplary calling party database capable of being managed by the service control point of the network illustrated in FIG. 2 and/or the application server of the network illustrated in FIG. 6.

FIGS. 10A and 10B depict portions of an exemplary calling party database capable of being provided in and/or managed by SCP 215 and/or application server 510. In one implementation, the database may be divided into separate tables. FIG. 10A provides an exemplary table 1000 for a personal contact. FIG. 10B provides an exemplary table 1060 for a contact group. In one implementation, the information provided in database portions 1000/1060 may be provided by any device in networks 200 and/or 500, and may be used by any device of networks 200 and/or 500.

As illustrated in FIG. 10A, table 1000 may include a variety of information associated with a calling party (e.g., calling party 110) that may be used to originate sequential calls and/or requests to multiple destinations associated with a called party. For example, table 1000 may include a profile name field 1005, a profile identification (ID) field 1010, a day/week field 1015, a time field 1020, a first phone number field 1025, additional phone number fields 1030, a last phone number field 1035, a no-answer condition field 1040, a busy condition field 1045, and a variety of records or entries 1050 associated with fields 1015-1045.

Profile name field 1005 may include a name of a called party that may receive calls using the originating locator service. Profile ID field 1010 may include a number (e.g., a two-digit code) or other identifier associated with a corresponding name in profile name field 1005. Entries in table 1000 may be associated with the name in profile name field 1005 and/or the number in profile ID field 1010. For example, profile name field 1005 may include a name "John," and profile ID field may include a number "01." In response to a prompt from intelligent peripheral 220 or IVR system 515, a calling party may provide either the name "John" (e.g., via text or voice recognition input) or the number "01" (e.g., which may correspond to "John") to identify which called party is to receive sequential calls and/or requests at multiple destinations.

Day/week field 1015 and time field 1020 may include user settings to define when conditions in other fields (e.g., first phone number field 1025, additional phone number fields 1030, last phone number field 1035, no-answer condition field 1040, and busy condition field 1045) should be performed. For example, day/week field 1015 may identify a range of days, such as a business week (e.g., "Mon.-Fri." as shown in the first and second entries 1050 of table 1000) or a weekend ("Sat.-Sun." as shown in the third entry 1050 of table 1000). Time field 1020 may include particular time periods within the days identified in day/week field 1015. For example, time field 1020 may identify working hours (e.g., "9:00-16:00" as shown in the first entry 1050 of table 1000), evening hours (e.g., "16:01-23:00" as shown in the second entry 1050 of table 1000), or all day (e.g., as shown in the third entry 1050 of table 1000). In one implementation, table 1000 may also include a default or catch-all setting for periods not otherwise specified by the calling party (e.g., blank entries in day/week field 1015 and time field 1020 as shown in the fourth entry 1050 of table 1000).

First, additional, and last phone number fields 1025-1035 may include telephone numbers of multiple destinations (e.g., user devices 105, user agent devices 505, etc.) that may be called in sequence. The telephone numbers provided in phone number fields 1025-1035 may be associated with corresponding days and times of day/week field 1015 and time field 1020. The number of phone number fields 1025-1035 provided in table 1000 may depend on a number of destinations to be contacted by the originating locator service. Furthermore, each set of phone number entries associated with day/week field 1015 and time field 1020 may include more, fewer, and/or different telephone numbers than other entries associated with day/week field 1015 and time field 1020 (e.g., "Mon.-Fri., 9:00-16:00" may include five telephone numbers, and "Mon.-Fri., 16:01-23:00" may include three telephone numbers). In one example, entries 1050 of phone number fields 1025-1035 may include a ten-digit format (e.g., "NPA-NXX-XXXX").

No-answer condition field 1040 may include actions to be executed (e.g., by the originating locator service) if none of the calls in the sequence of destinations are answered (e.g., after a certain amount of rings for each called device). For example, a first entry 1050 may include an action "Voice mail" under no-answer condition field 1040. This may indicate that an unanswered sequence of calls during "Mon.-Fri., 9:00-16:00" should be sent to a designated voice mail for "John." A second entry 1050 may include an action "Email" under no-answer condition field 1040, which may indicate that an email should sent to "John" if the sequence of calls is not answered during "Mon.-Fri., 16:01-23:00". A third entry 1050 may include an action "Text Message" under no-answer condition field 1040, which may indicate that a text message should be sent to "John" if a sequence of calls during a weekend is not answered. A fourth entry 1050 may include a blank entry under no-answer condition field 1040, which may indicate that a default action may be used if a sequence of calls is not answered during an undesignated time period. A default action may include, for example, providing a voice recording to the calling party indicating none of the calls in the designated call sequence were answered.

Busy condition field 1045 may include actions to be executed (e.g., by the originating locator service) if one of the calls in the sequence of calls encounters a busy line. For example, a first entry 1050 may include an action "continue" under busy condition field 1045, which may indicate that the next phone number in the calling sequence should be used if a busy line is encountered. A second entry 1050 may include an action "Voice mail" under busy condition field 1045, which may indicate that, if a busy line is encountered, a voice mail should be sent to the phone number associated with the busy line.

FIG. 10B provides an exemplary table 1060 for a contact group. Table 10B may include the configuration and/or fields described above in connection with table 1000 of FIG. 10A. Referring to FIG. 10B, table 1060 may be configured to conduct sequential calls to multiple destinations within a group. For example, a group of fungible services may be included in table 1060. As shown in FIG. 10B, profile name field 1005 may include a name "Pizza Fix," and profile ID field may include a number "02." In response to a prompt from intelligent peripheral 220 or IVR system 515, a calling party may provide either the name "Pizza Fix" (e.g., via text or voice recognition input) or the number "02" (e.g., which may correspond to "Pizza Fix") to identify which contact group is to receive sequential calls and/or requests at multiple destinations.

In table 1060, a first entry 1065 may include, in fields 1025-1035, a sequence of phone numbers for pizza establishments of interest to the calling party during workday lunch hours (e.g., "Mon.-Fri., 11:00-14:00"). A second entry 1065 may include, in fields 1025-1035, a sequence of phone numbers for pizza establishments of interest to the calling party during weekends (e.g., "Sat.-Sun., 11:00-14:00"). A third entry 1065 may include, in fields 1025-1035, a sequence of phone numbers for pizza establishments of interest at all other times.

An action "Try in X minutes" (where "X" is a numerical value) under no-answer condition field 1040 in the first, second and third entries of table 1060 may indicate that an unanswered sequence of calls for "Pizza Fix" should be repeated in X minutes. An action "Continue" under busy condition field 1045 in the first, second and third entries of table 1060 may indicate that the next phone number in the calling sequence should be used if a busy line is encountered.

Although FIGS. 10A and 10B shows exemplary information that may be provided in tables 1000 and 1060, in other implementations, tables 1000 and 1060 may contain less, different, differently arranged, or additional information than depicted in FIGS. 10A and 10B.

In one exemplary implementation, application server 510 may include a user interface that provides for display, to calling party 110 (e.g., via user agent device 505), a calling party database similar to table 1000 and/or table 1060. The user interface may include a graphical user interface (GUI), a non-graphical user interface (e.g., a text-based interface), a web-based user interface, etc. The user interface may provide information to users (e.g., calling party 110) via a customized interface (e.g., a proprietary interface) and/or other types of interfaces (e.g., a browser-based interface). The user interface may receive user inputs via one or more input devices (e.g., input device 960), may be user configurable (e.g., a user may change the size of the user interface, information displayed in the user interface, color schemes used by the user interface, positions of text, images, icons, windows, etc., in the user interface, etc.), or may not be user configurable. The user interface may be displayed to a user via one or more output devices (e.g., output device 970).

In one example, a list of names and/or table IDs (e.g., from table name field 1005 and/or table ID field 1010) may be displayed to calling party 110 (e.g., via user agent device 505), and calling party 110 may select one of the tables (e.g., "John") from a list of names and/or table IDs. The originating locator service may generate sequential calls and/or requests to multiple destinations (e.g., the telephone numbers provided in phone number fields 1025-1035) associated with the selected name. In another example, the user interface may enable the calling party 110 to manage (e.g., edit, create, delete, etc.) entries provided in the calling party tables (e.g., table 1000 and table 1060).

Figure 11:
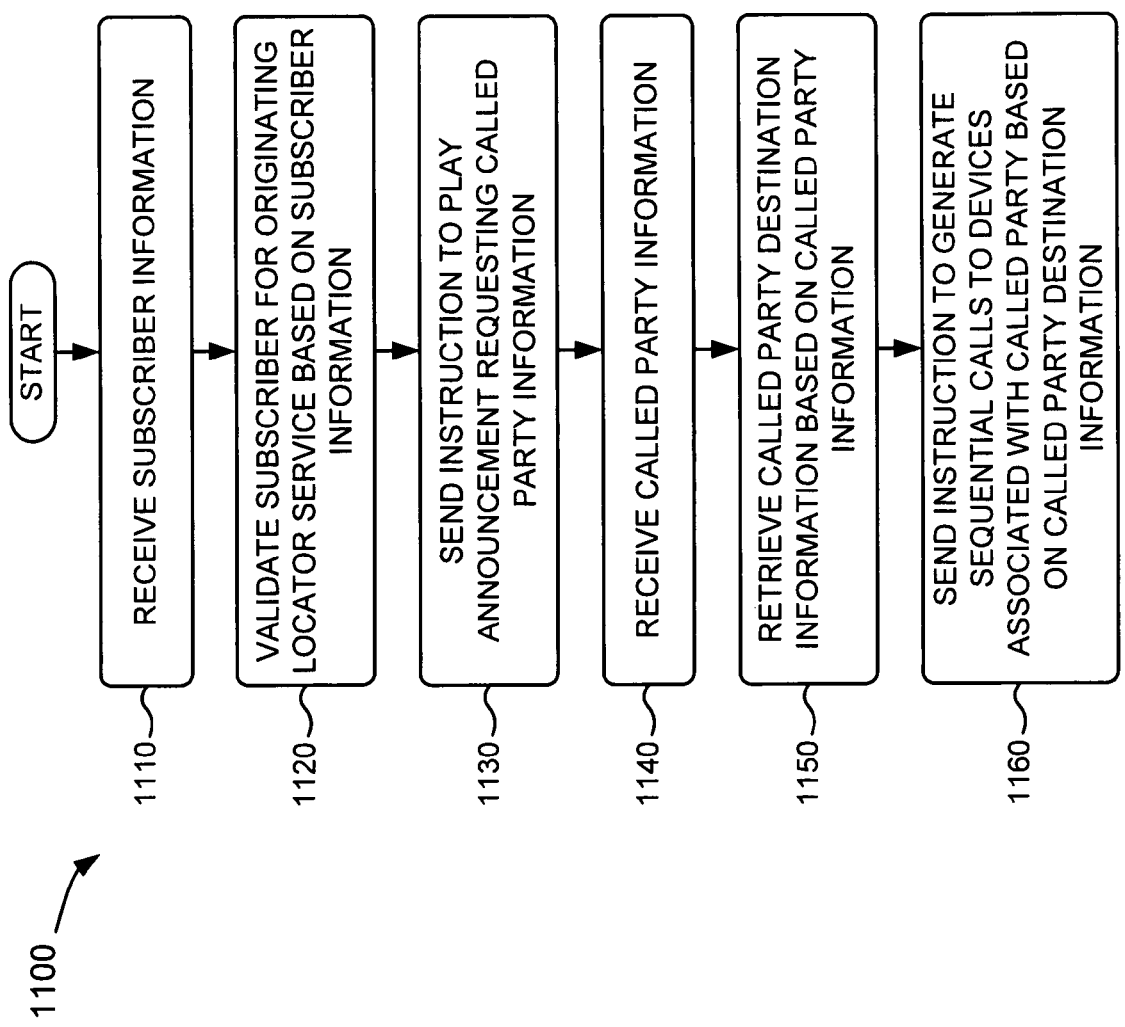

FIG. 11 depicts a flow chart of an exemplary process 1100 for initiating sequential calls to user devices associated with a called party according to implementations described herein. In one implementation, process 1100 may be performed by SCP 215 and/or application server 510. In another implementation, some or all of process 1100 may be performed by another device or group of devices, including or excluding SCP 215 and/or application server 510.

As illustrated in FIG. 11, process 1100 may begin with receipt of subscriber information (block 1110), and validation of a subscriber for a sequential calling service (e.g., the originating locator service) based on the subscriber information (block 1120). For example, in implementations described above in connection with FIG. 2, calling party 110 may input access code 235 (or use some other verification mechanism, such as voice recognition) via his/her user device 105. User device 105 may provide access code 235 to SSP 210. SSP 210 may provide access code 235 and/or query 240 to SCP 215 for validation/execution. SCP 215 may receive access code 235 and/or query 240, and may execute query 240 on a database of subscriber records to verify or validate that calling party 110 subscribes to the originating locator service. In one example, the database of subscriber records may include a list of access codes for subscribers to the originating locator service. If access code 235 matches an access code provided in the list of access codes, SCP 215 may validate calling party 110 and may retrieve records associated with calling party 110.

As further shown in FIG. 11, an instruction to play an announcement requesting called party information may be sent (block 1130), and called party information may be received (block 1140). For example, in implementations described above in connection with FIG. 2, SCP 215 may provide instruction 245 to intelligent peripheral 220 to play an announcement that may prompt calling party 110 to input an identifier (e.g., a two-digit list identification, a name, etc.) for a person or group that calling party 110 wishes to contact with the originating locator service. Intelligent peripheral 220 may play an announcement 250 (e.g., requesting an identifier) for calling party 110 (e.g., via user device 105), and, in response, calling party 110 may provide input information 255 (e.g., a list identification) to intelligent peripheral 220 (e.g., via user device 105). Intelligent peripheral 220 may provide input information 255 to SCP 215.

Returning to FIG. 11, called party destination information may be retrieved based on the received called party information (block 1150), and an instruction to generate sequential calls to devices associated with the called party may be sent based on the called party destination information (block 1160). For example, in implementations described above in connection with FIG. 2, if calling party 110 enters a valid list identification (e.g., via user device 105), SCP 215 may retrieve called party destination information (e.g., one or more telephone numbers) based on input information 255, and may provide instruction 265 to intelligent peripheral 220 to initiate a sequence of calls to the telephone numbers associated with input information 255.

Figure 12:
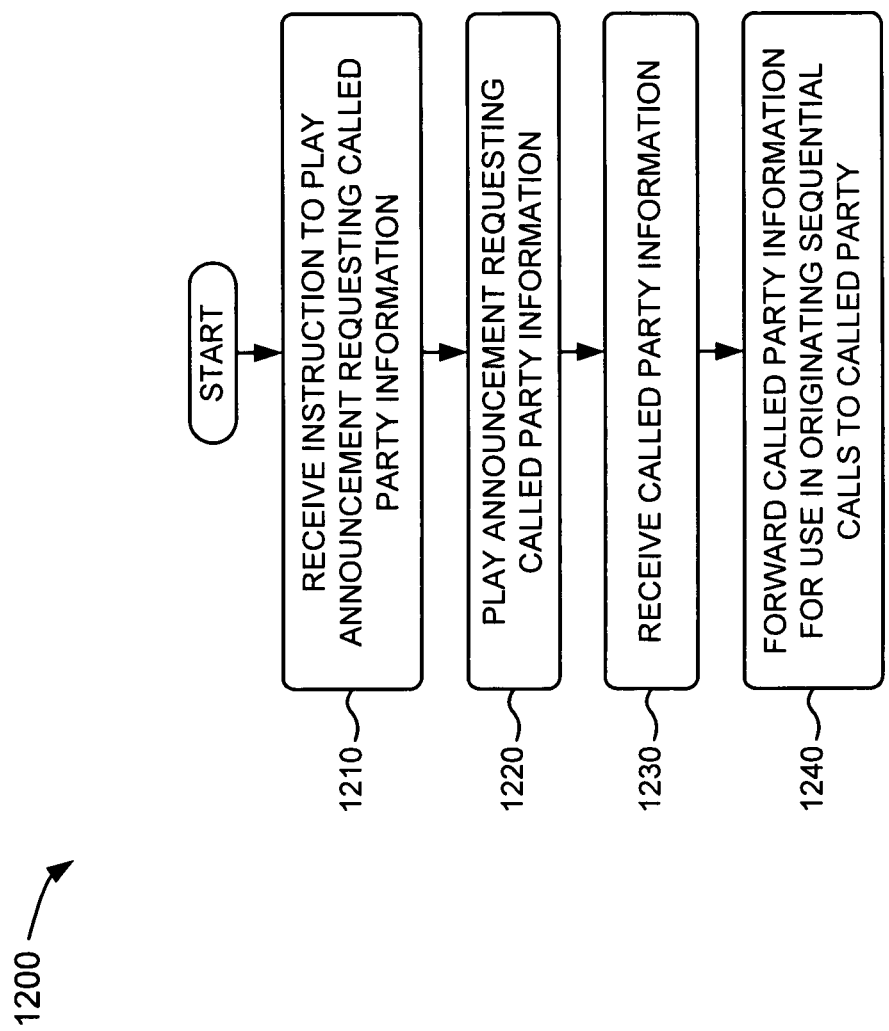

FIG. 12 depicts a flow chart of an exemplary process 1200 for retrieving called party information according to implementations described herein. In one implementation, process 1200 may be performed by intelligent peripheral 220 and/or IVR system 515. In another implementation, some or all of process 1200 may be performed by another device or group of devices, including or excluding intelligent peripheral 220 and/or IVR system 515.

As illustrated in FIG. 12, process 1200 may begin with receipt of an instruction to play an announcement requesting called party information (block 1210), and playing the announcement requesting the called party information (block 1220). For example, in implementations described above in connection with FIG. 5, application server 510 may provide instruction 535 to IVR system 515 to play an announcement that may prompt calling party 110 to input an identifier (e.g., a two-digit profile identification) for a person or group that calling party 110 wishes to contact with the originating locator service. IVR system 515 may play announcement 540 (e.g., requesting an identifier) for calling party 110 (e.g., via user agent device 505).

As further shown in FIG. 12, the called party information may be received (block 1230), and the called party information may be forwarded for use in originating sequential calls to the called party (block 1240). For example, in implementations described above in connection with FIG. 5, calling party 110 may provide input information 545 (e.g., a list identification) to IVR system 515 (e.g., via user agent device 505) in response to announcement 540, and IVR system 515 may provide input information 545 to application server 510.

Figure 13:
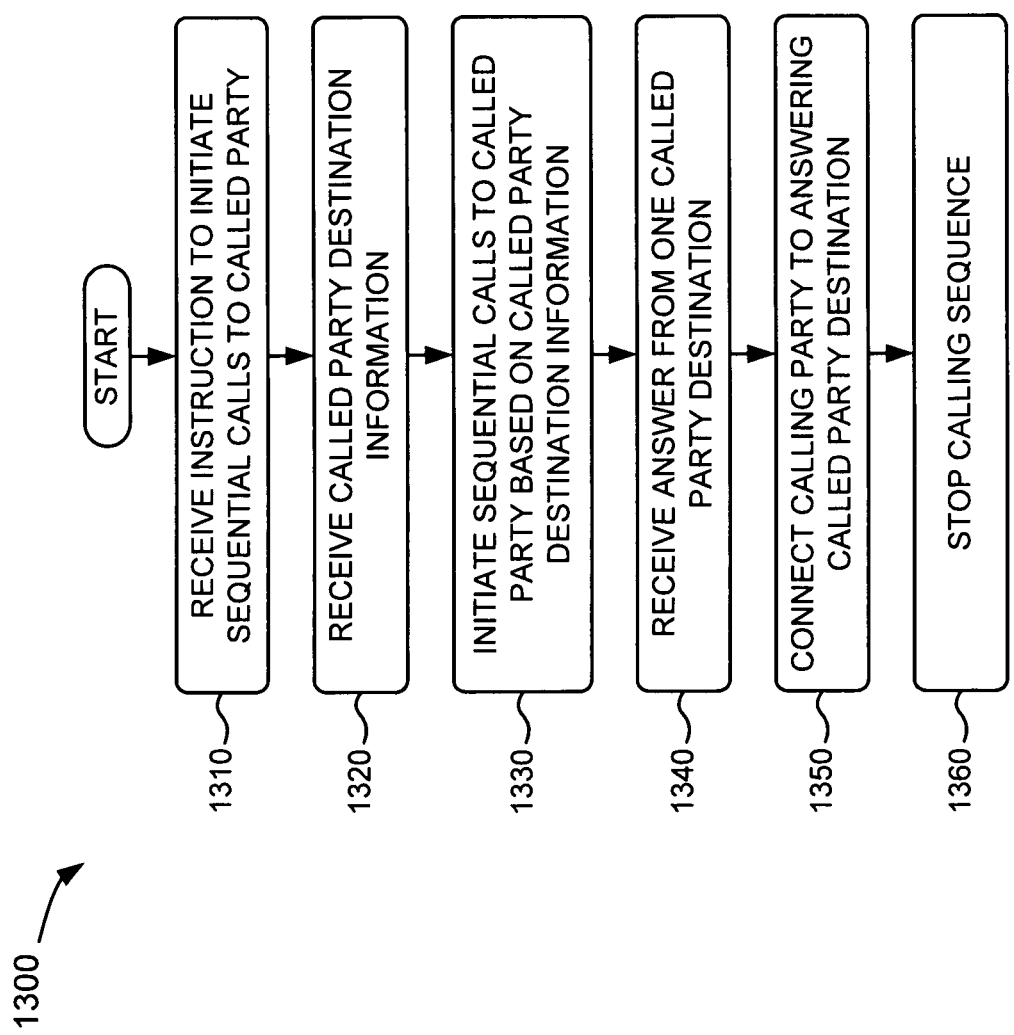

FIG. 13 depicts a flow chart of an exemplary process 1300 for initiating sequential calls to a called party according to implementations described herein. In one implementation, process 1300 may be performed by intelligent peripheral 220 and/or redirect/proxy server 520. In another implementation, some or all of process 1300 may be performed by another device or group of devices, including or excluding intelligent peripheral 220 and/or redirect/proxy server 520.

As illustrated in FIG. 13, process 1300 may begin with receipt of an instruction to initiate sequential calls to the called party (block 1310), and receipt of called party destination information (block 1320). For example, in implementations described above in connection with FIG. 2, if calling party 110 enters a valid list identification 255 (e.g., via user device 105), SCP 215 may route calling party 110 to intelligent peripheral 220, as indicated by reference number 260, and may provide instruction 265 to intelligent peripheral 220 to initiate a sequence of calls to the telephone numbers associated with input information 255.

As further shown in FIG. 13, sequential calls to the called party may be initiated based on the called party destination information (block 1330), and an answer may be received from one called party destination (block 1340). For example, in implementations described above in connection with FIG. 2, intelligent peripheral 220 may originate a calls 270 to multiple destinations (e.g., user devices 105-1, 105-2, and/or 105-3) in a sequence associated with input information 255, and the called party (e.g., John) may answer one of user devices 105-1, 105-2, and/or 105-3.

The calling party may be connected to the answering called party destination (block 1350), and the calling sequence may be stopped (block 1360). For example, in implementations described above in connection with FIG. 2, if the called party (e.g., John) answers one of user devices 105-1, 105-2, and/or 105-3, intelligent peripheral 220 may establish a connection between calling party 110 and the destination (e.g., the called party) by bridging calling party 110 to a destination (e.g., the answering one of user devices 105-1, 105-2, and/or 105-3) associated with the called party. Intelligent peripheral 220 may also stop the calling sequence once a successful connection with a destination in indicated.

Figure 14A:
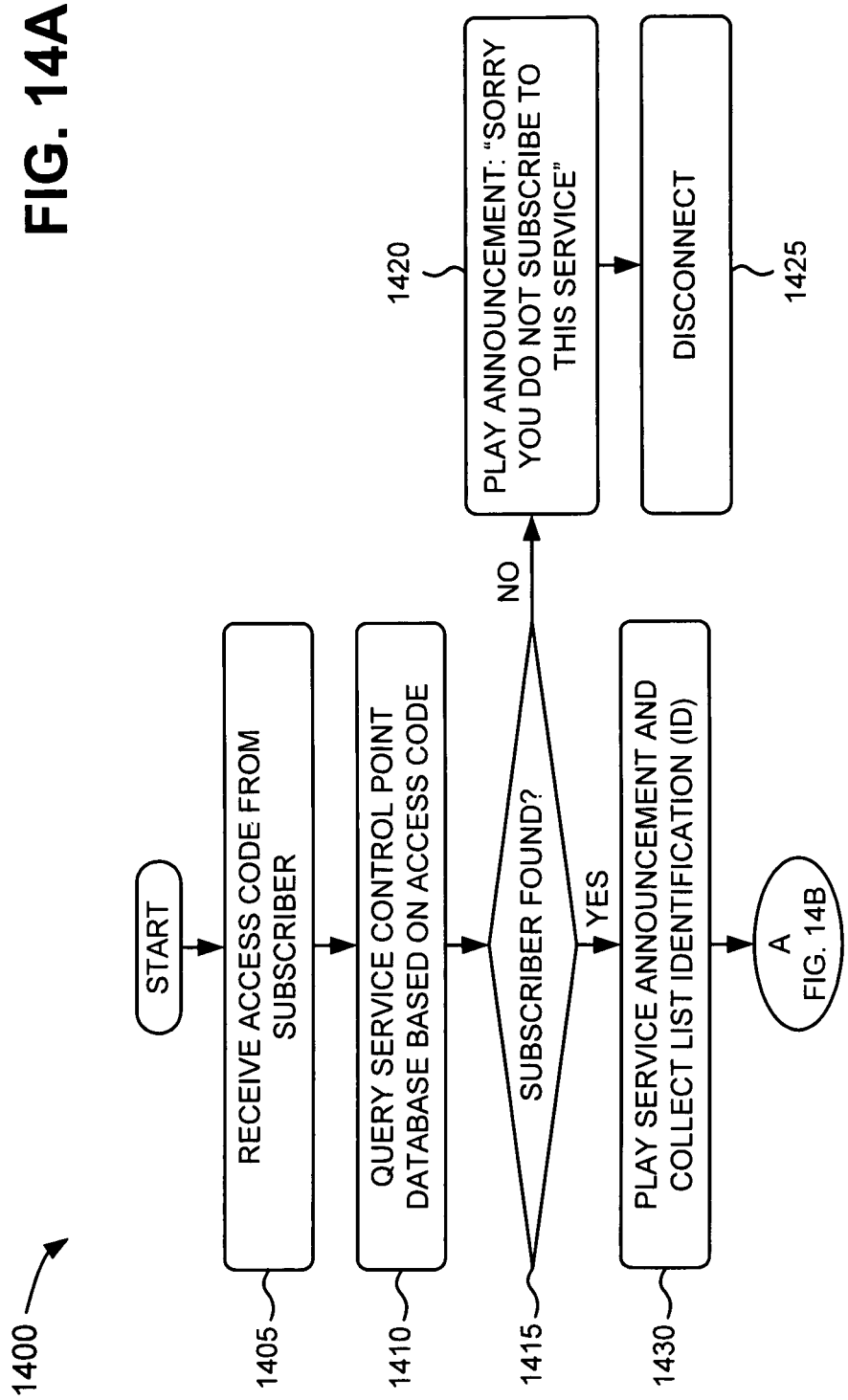
Figure 14B:
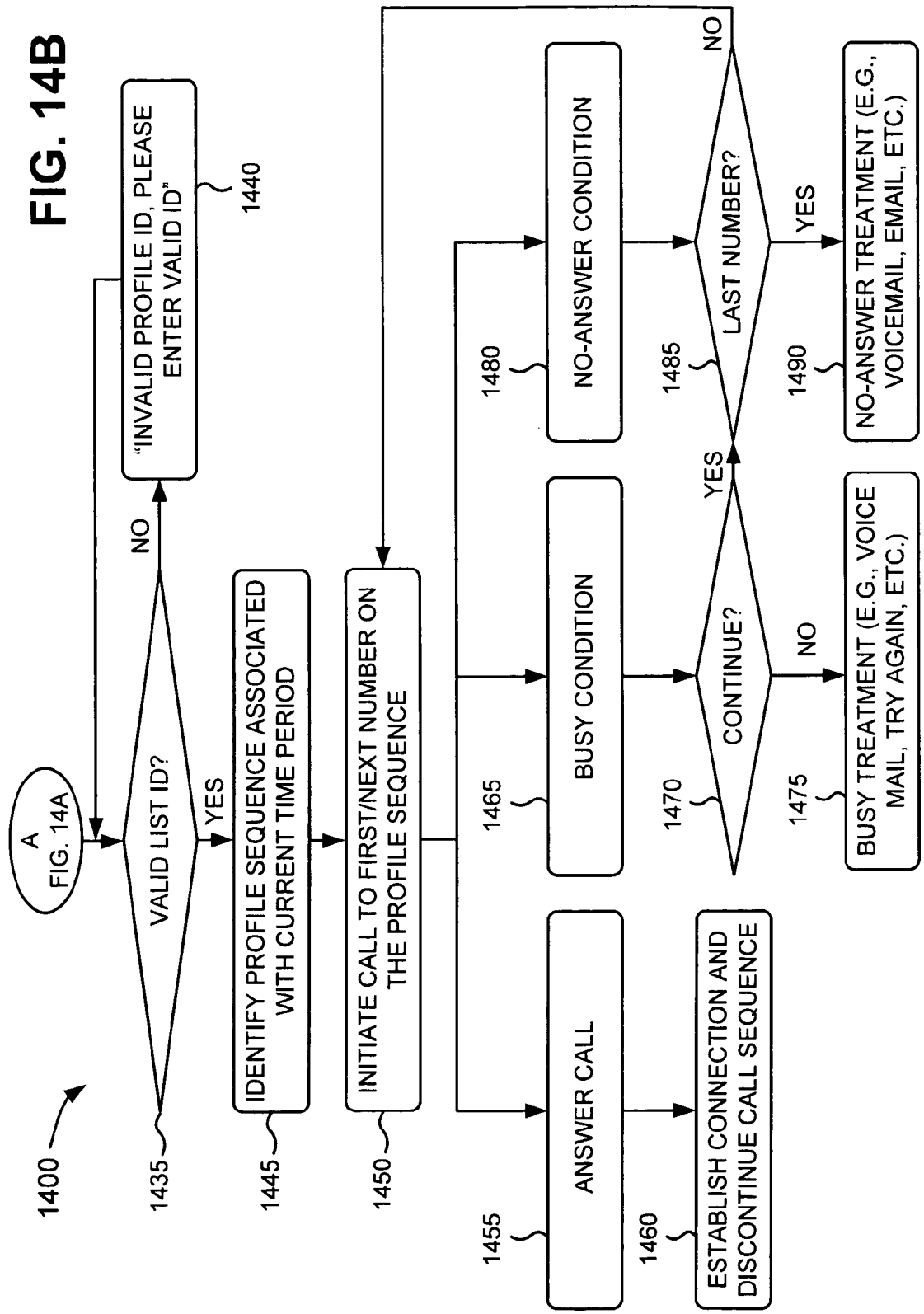

FIGS. 14A and 14B depict flow charts of an exemplary process 1400 for originating a sequence of calls for a calling party according to implementations described herein. In one implementation, process 1400 may be performed by one or more devices of network 200. In another implementation, some or all of process 1400 may be performed by another device or group of devices, including or excluding the one or more devices of network 200.

As illustrated in FIG. 14A, process 1400 may begin with receipt of an access code from a subscriber or calling party (block 1405), and querying of a service control point database based on the access code (block 1410). For example, in implementations described above in connection with FIG. 2, calling party 110 may enter an access code 235 (or use some other verification mechanism, such as voice recognition) via his/her user device 105. User device 105 may provide access code 235 to SSP 210, and SSP 210 may suspend call processing and may generate query 240 based on access code 235. SSP 210 may provide access code 235 and/or query 140 to SCP 215 for execution. SCP 215 may receive access code 235 and/or query 140, and may execute query 140 on a database of subscriber records to verify or validate that calling party 110 subscribes to the originating locator service. In one example, the database of subscriber records may include a list of access codes for subscribers to the originating locator service.

As further shown in FIG. 14A, if the subscriber is not found (block 1415—NO), an announcement (e.g., "Sorry, you do not subscribe to this service") may be played (block 1420) and the call may be disconnected (block 1425). For example, in one implementation, if access code 235 does not match an access code provided in the list of access codes, SCP 215 (e.g., via intelligent peripheral 220) may play an announcement (e.g., "Sorry you do not subscribe to this service"), and SCP 215 may disconnect calling party 110.

Returning to FIG. 14A, if the subscriber is found (block 1415—YES), a service announcement may be played and list identification may be collected or received (block 1430). For example, in implementations described above in connection with FIG. 2, if access code 235 matches an access code provided in the list of access codes, SCP 215 may retrieve records associated with calling party 110, and may provide instruction 245 to intelligent peripheral 220 to play an announcement that may prompt calling party 110 to input an identifier (e.g., a two-digit profile identification) for a person or group that calling party 110 wishes to contact with the originating locator service. Intelligent peripheral 220 may play announcement 150 (e.g., requesting an identifier) for calling party 110 (e.g., via user device 105), and calling party 110 may provide input information 255 (e.g., a profile identification) to intelligent peripheral 220 (e.g., via user device 105). Intelligent peripheral 220 may provide input information 255 to SCP 215.

As shown in FIG. 14B, if a valid list identification is not received (block 1435—NO), a message (e.g., "Invalid profile ID, please enter valid ID") may be played (block 1440) and process 1400 may return to block 1435. For example, in one implementation, if calling party 110 does not enter a valid list identification 255, SCP 215 (e.g., via intelligent peripheral 220) may play a message (e.g., "Invalid profile ID, please enter valid ID"), and may request calling party 110 to input a valid list identification 255.

As further shown in FIG. 14B, if a valid list identification is received (block 1435-YES), a profile sequence associated with the current time period may be identified (block 1445), and a call may be initiated to a first/next number in the profile sequence (block 1450). For example, in one implementation described above in connection with FIG. 2, if calling party 110 enters a valid list identification 255 (e.g., via user device 105), SCP 215 may route calling party 110 to intelligent peripheral 220, as indicated by reference number 260. SCP 215 may obtain (e.g., from database 320) a profile sequence associated with input information 255 and the current time, and may provide instruction 265 to intelligent peripheral 220 to initiate a sequence of calls to telephone number associated with input information 255 and current time. Intelligent peripheral 220 may initiate the first in the sequence of calls 170 to one of the multiple destinations (e.g., user devices 105-1, 105-2, and/or 105-3) associated with input information 155.

Referring back to FIG. 14B, each of the calls in the sequence may experience one of answering the call (block 1455), a busy condition (block 1465), or a no-answer condition (block 1480). For example, in one implementation described above in connection with FIG. 2, a call to the first telephone number in the sequence (e.g., to user device 105-1) may be answered by called party 120, have a busy line, or not be answered by called party 120.

Returning to FIG. 14B, if one of the destinations answers the call (block 1455), a connection may be established between the calling party and the answering destination and the call sequence may be discontinued (block 1460). For example, in one implementation described above in connection with FIG. 2, if the called party answers user devices 105-1, intelligent peripheral 220 may bridge calling party 110 to the destination (e.g., user devices 105-1) associated with the called party, and discontinue the call sequence to other user devices (e.g., user devices 105-2 and/or 105-3) in the profile list. A connection may be established between calling party 110 and the destination (e.g., called party 120).

As further shown in FIG. 14B, if a busy condition is encountered (block 1465), it may be determined whether the profile includes a continue command for the busy condition (block 1470). For example, user instructions (e.g., continue, go to voice mail, try again, etc.) for a busy condition may be retrieved from a table (e.g., table 1000) associated with a profile identification in database 320 of SCP 215. If the user instructions for a busy signal include a continue command (block 1470—YES), it may be determined if the called number is the last number in the calling sequence associated with the profile identification (block 1485, discussed below). If the user instructions for a busy signal do not include a continue command (block 1470—NO), a busy treatment (e.g., go to voice mail, try again, etc.) may be executed for the call (block 1475).

If a no-answer condition is encountered (block 1475), it may be determined if the called number is the last number in the calling sequence associated with the profile identification (block 1485). If the called number is not the last number in the calling sequence associated with the profile identification (block 1485—NO), a call to the next number on the profile sequence may be initiated (block 1450) and process 1400 may be repeated from that point.

If the called number is the last number in the calling sequence associated with the profile identification (block 1485—YES), a no-answer condition associated with the profile identification and retrieved from a table (e.g., table 1000) in database 320 may be executed for the call (block 1490). For example, in one implementation described above in connection with FIG. 2, if none of the calls 270 in the calling sequence are answered by user devices 105-1, 105-2, and/or 105-3 after a number of rings, SCP 215 may execute an action defined (e.g., in a table of the called party database) for a "no-answer" condition. In one example, SCP 215 may forward the call to voice mail if the last call in the sequence was not answered after a predefined number of rings.

FIGS. 15A and 15B depict flow charts of an exemplary process 1500 for originating a sequence of calls for a calling party according to implementations described herein. In one implementation, process 1500 may be performed by one or more devices of network 500. In another implementation, some or all of process 1500 may be performed by another device or group of devices, including or excluding the one or more devices of network 500.

As illustrated in FIG. 15A, process 1500 may begin with receipt of an access code from a subscriber (block 1505), and review of a subscriber account based on the access code (block 1510). For example, in implementations described above in connection with FIG. 5, calling party 110 may enter access code 235 (or use some other verification mechanism, such as a username and/or password) via his/her user agent device 505. Application server 510 may receive access code 235, and may determine whether the originating locator service is activated for calling party 110 based on a comparison with a database of subscriber records. In one example, the database of subscriber records may include a list of access codes for subscribers to the originating locator service.

As further shown in FIG. 15A, if an originating locator service (OLS) is not activated (block 1515—NO), an announcement (e.g., "Sorry, you do not subscribe to this service") may be played (block 1520) and the called may be disconnected (block 1525). For example, in implementations described above in connection with FIG. 5, if access code 235 does not match an access code provided in the list of access codes, application server 510 (e.g., via IVR system 515) may play an announcement (e.g., "Sorry you do not subscribe to this service"), and application server 510 may disconnect calling party 110.

Returning to FIG. 15A, if the originating locator service (OLS) is activated (block 1515—YES), a service announcement may be played and list identification may be collected (block 1530). For example, in implementations described above in connection with FIG. 5, if access code 235 matches an access code provided in the list of access codes, application server 510 may retrieve records associated with calling party 110, and may provide instruction 535 to IVR system 515 to play an announcement that may prompt calling party 110 to input an identifier (e.g., a two-digit list identification) for a person or group that calling party 110 wishes to contact with the originating locator service. IVR system 515 may play an announcement 540 (e.g., requesting an identifier) for calling party 110 (e.g., via user agent device 505), and calling party 110 may provide input information 545 (e.g., a list identification) to IVR system 515 (e.g., via user agent device 505). IVR system 515 may provide input information 545 to application server 510.

As shown in FIG. 15B, if a valid profile identification is not received (block 1535-NO), a message (e.g., "Invalid profile ID, please enter valid ID") may be played (block 1540) and process 1500 may return to block 1535. For example, in one implementation described above in connection with FIG. 5, if calling party 110 does not enter a valid profile identification 545, application server 510 (e.g., via IVR system 515) may play a message (e.g., "Invalid profile ID, please enter valid ID"), and may request calling party 110 to input a valid profile identification 545.

As further shown in FIG. 15B, if a valid profile identification is received (block 1535-YES), a profile sequence associated with the current time period may be identified (block 1545), and a request may be initiated to a first/next number on the profile sequence (block 1550). For example, in one implementation described above in connection with FIG. 5, if calling party 110 enters a valid profile identification 545 (e.g., via user agent device 505), application server 510 may initiate a sequence of called party requests 550 to multiple destinations (e.g., user agent devices 505-1 and 505-2, user devices 105-1 and 105-2, etc.) associated with input information 545 and the current time period. Starting with the first request, redirect/proxy server 520 may route called party requests 550 based on locations of termination endpoints, and may alert (or ring) the terminating endpoints (e.g., a VoIP telephone, a PC soft client, a POTS telephone, etc.). In one example, redirect/proxy server 520 may send called party requests 550 to user agent devices 505-1 and 505-2, and may send, via PSTN gateway 525 and/or PSTN network 530, called party requests 550 to user devices 105-1 and 105-2.

Referring back to FIG. 15B, each call in the sequence of calls may experience one of answering the call (block 1555), a busy condition (block 1565), or a no-answer condition (block 1580). For example, in one implementation described above in connection with FIG. 5, a call to the first telephone number in the sequence (e.g., to user device 105-1) may be answered by called party 120, have a busy line, or not be answered by called party 120.

Returning to FIG. 15B, if the call is answered at one of the destinations (block 1555), a response from the answering destination may be forwarded to the calling party and a two-way speech path may be established between the calling party and the answering destination (block 1560). For example, in one implementation described above in connection with FIG. 5, if the called party answers one of user agent devices 505-1 and 505-2, and/or user devices 105-1 and 105-2, the answering destination (e.g., user agent device 505-1) associated with the called party may forward answer 555 to redirect/proxy server 520. Redirect/proxy server 520 may forward answer 555 to application server 510, and application server 510 may send answer 555 to user agent device 505. User agent device 505 may use information contained in answer 555 (e.g., an IP address associated with user agent device 505-1) to establish a two-way speech path 560 with user agent device 505-1. Once an answer is received from one of the calls in the sequence of calls, the sequence may be discontinued.

As further shown in FIG. 15B, if a busy condition is encountered (block 1565), it may be determined whether the profile includes a continue command for the busy condition (block 1570). For example, user instructions (e.g., continue, go to voice mail, try again, etc.) for a busy condition may be retrieved from a table (e.g., table 1000) associated with a profile identification in database 610 of application server 510. If the user instructions for a busy signal include a continue command (block 1570—YES), it may be determined if the called number is the last number in the calling sequence associated with the profile identification (block 1585, discussed below). If the user instructions for a busy signal do not include a continue command (block 1570—NO), a busy treatment (e.g., go to voice mail, try again, etc.) may be executed for the call (block 1575).

If a no-answer condition is encountered (block 1575), it may be determined if the called number is the last number in the calling sequence associated with the profile identification (block 1585). If the called number is not the last number in the calling sequence associated with the profile identification (block 1585—NO), a call to the next number on the profile sequence may be initiated (block 1550) and process 1500 may be repeated from that point.

If the called number is the last number in the calling sequence associated with the profile identification (block 1585—YES), a no-answer condition associated with the profile identification and retrieved from a table (e.g., table 1000) in database 610 may be executed for the call (block 1590). For example, in one implementation described above in connection with FIG. 5, if none of the call requests 550 in the calling sequence are answered by user devices 105-1, 105-2, and/or 105-3 after a number of rings, application server 510 may execute an action defined (e.g., in a table of the called party database) for a "no-answer" condition. In one example, application server 510 may forward the call to voice mail if the last call in the sequence was not answered after a predefined number of rings.

Implementations described herein may provide an originating locator service that enables a calling party to automatically call a sequence of telephone numbers and to connect to a first destination in the sequence at which the call is answered. The originating locator service may aid a calling party that has multiple contact telephone numbers for the same person, and may permit the calling party to create a profile with lists of telephone numbers and relevant time periods for the telephone numbers, and to assign a profile name and an identifier to each list.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11-15B, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a device and from a calling party, destination information,
      the destination information identifying multiple destinations associated with a single called party,
         each of the multiple destinations being associated with a different phone number;
   receiving, by the device, information associated with the calling party;
   validating, by the device, the calling party based on the information associated with the calling party;
   receiving, by the device, identification information associated with the called party;
   retrieving, by the device, the destination information based on the identification information associated with the called party;
   sending, by the device and based on a time of day associated with receiving the identification information, an instruction to originate a sequence of calls to the multiple destinations based on the destination information,
      a first order of the sequence of calls including information identifying a plurality of destinations, of the multiple destinations, and being based on a first time of day associated with receiving the destination information, and
      a second order of the sequence of calls including information identifying a plurality of destinations, of the multiple destinations, and being based on a second time of day associated with receiving the destination information,
         the first order being different than the second order and the first time of day being different than the second time of day;
   receiving, by the device and based on a call to a first destination of the multiple destinations, information, from the first destination, indicating a busy condition; and
   executing, by the device, a busy condition treatment by sending, based on stored information indicating that a continue command is associated with the busy condition, another call to the first destination before sending a call, of the sequence of calls, to a second destination of the multiple destinations.

2. The method of claim 1, further comprising:
   sending an instruction to play an announcement requesting the identification information associated with the called party; and
   receiving the identification information associated with the called party from the calling party based on the announcement.

3. The method of claim 1, further comprising:
   receiving an answer from the second destination;
   connecting the calling party to the second destination; and
   discontinuing a remainder of the sequence of calls.

4. The method of claim 1,
   where the busy condition treatment is defined in the destination information.

5. The method of claim 1, further comprising:
   receiving, from a third destination of the multiple destinations and based on a call to the third destination, information indicating a busy condition associated with the third destination; and
   executing a busy condition treatment for the third destination,
   where executing the busy condition treatment for the third destination comprises one or more of:
      continuing to a next destination of the multiple destinations associated with a next call in the sequence of calls;
      leaving a voice mail for the called party;
      sending an email to the called party;
      paging the called party;
      sending a text message to the called party; or
      re-trying the call to the third destination.

6. The method of claim 1, further comprising:
   receiving a no-answer condition from the second destination; and
   executing a no-answer condition treatment for the second destination,
   where the no-answer condition treatment is defined in the destination information.

7. The method of claim 6, where executing the no-answer condition treatment comprises one or more of:
   continuing to a next destination of the multiple destinations associated with a next call in the sequence of calls;
   leaving a voice mail for the called party;
   sending an email to the called party;
   paging the called party; or
   sending a text message to the called party.

8. A method comprising:
   receiving, by a device and from a calling party device, called party destination information,
      the called party destination information including multiple calling destinations, each of the multiple calling destinations being associated with a different phone number;
   receiving, by the device, a request from the calling party device to originate a sequence of calls to a single called party;
   sending, by the device and based on a time of day associated with receiving the request, an instruction to originate a sequence of calls to the multiple calling destinations based on the called party destination information,
      a first order of the sequence of calls including information identifying a plurality of destinations, of the multiple calling destinations, and being based on a first time of day associated with receiving the called party destination information, and
      a second order of the sequence of calls including information identifying a plurality of destinations, of the multiple calling destinations, and being based on a second time of day associated with receiving the called party destination information,
         the first order being different than the second order and the first time of day being different than the second time of day;
   originating, by the device and based on the instruction, a first call in the sequence of calls to a first calling destination, of the multiple calling destinations, based on the called party destination information and the time of day;
   receiving, by the device, information indicating that the first call is not answered; and
   executing, by the device and based on the information indicating that the first call is not answered, a busy condition treatment by sending, based on stored information, a second call to the first calling destination before sending a third call, of the sequence of calls, to a second calling destination of the multiple calling destinations.

9. The method of claim 8, further comprising:
receiving an answer for the third call from the second calling destination; and
connecting the calling party device to the second call second calling destination.

10. The method of claim 8, further comprising:
where the busy condition treatment is defined in the called party destination information.

11. The method of claim 8, further comprising:
receiving, from a third calling destination of the multiple calling destinations and based on a call to the third calling destination, information indicating a busy condition associated with the third calling destination; and
executing a busy condition treatment for the third calling destination,
where executing the busy condition treatment for the third calling destination comprises one or more of:
continuing to a next destination of the multiple calling destinations in the sequence of calls;
leaving a voice mail for the called party;
sending an email to the called party;
paging the called party;
sending a text message to the called party; or
re-trying the call to the third calling destination.

12. The method of claim 8, further comprising:
receiving a no-answer condition from the second calling destination; and
executing a no-answer condition treatment for the second calling destination.

13. The method of claim 12, where executing the no-answer condition treatment comprises one or more of:
continuing to a next destination of the multiple calling destinations in the sequence of calls;
leaving a voice mail for the called party;
sending an email to the called party;
paging the called party; or
sending a text message to the called party.

14. A device comprising:
a memory to store a plurality of instructions; and
a processor to execute the plurality of instructions to:
receive calling party information associated with a calling party;
validate the calling party for an originating locator service based on the calling party information;
send an instruction to play an announcement requesting called party information associated with a single called party;
receive the called party information from the calling party based on the announcement;
retrieve called party destination information based on the called party information,
the called party destination information identifying multiple destinations associated with the called party,
each of the multiple destinations being associated with a different phone number;
send, based on a time of day associated with receiving the called party information, an instruction to originate a sequence of calls to the called party based on the called party destination information,
a first order of the sequence of calls including information identifying a plurality of destinations, of the multiple destinations, and being based on a first time of day associated with receiving the called party information, and
a second order of the sequence of calls including information identifying a plurality of destinations, of the multiple destinations, and being based on a second time of day associated with receiving the called party information,
the first order being different than the second order and the first time of day being different than the second time of day;
receive, based on a call to a first destination of the multiple destinations, information, from the first destination, indicating a busy condition; and
execute a busy condition treatment by sending, based on stored information indicating that a continue command is associated with the busy condition, another call to the first destination before sending a call, of the sequence of calls, to a second destination of the multiple destinations.

15. The device of claim 14, where
the calling party information comprises an access code associated with the calling party, and
the processor is further to:
compare the access code to a table of access codes associated with the originating locator service; and
validate the calling party if the access code matches one of the access codes contained in the table.

16. The device of claim 14, where
the called party information comprises an identifier of the called party, and
the processor is further to:
compare the called party identifier to information in a calling party database; and
retrieve the called party destination information from the calling party database based on the comparison.

17. The device of claim 16, where the calling party database comprises at least one of:
one or more names of people capable of being called by the calling party using the originating locator service;
one or more identifiers associated with the one or more names;
one or more telephone numbers associated with the one or more names, the one or more telephone numbers defining a calling sequence;
one or more time periods associated with the calling sequence;
one or more no-answer conditions associated with the one or more names; or
one or more busy conditions associated with the one or more names.

18. The device of claim 14, where the called party destination information comprises a plurality of sequences of telephone numbers associated with the called party.

19. The device of claim 14, where the processor is further to:
terminate the other call; and
automatically initiate, based on terminating the other call, a further call to the second destination.

20. The device of claim 14, where the device comprises at least one of:
a service switching point;
a service control point;
an intelligent peripheral;
an application server;

an interactive voice response system;
a redirect server; or
a proxy server.

21. A non-transitory computer-readable medium storing instructions, the instructions comprising:
one or more instructions, which, when executed by a processor of a device, cause the processor to:
receive calling party information associated with a calling party;
validate the calling party for an originating locator service based on the calling party information;
send an instruction to play an announcement requesting called party information associated with a single called party;
receive the called party information from the calling party based on the announcement;
retrieve called party destination information based on the called party information,
the called party destination information identifying multiple destinations associated with the called party,
each of the multiple destinations being associated with a different phone number;
send, based on a time of day associated with receiving the called party information, an instruction to originate a sequence of calls to the called party based on the called party destination information,
a first order of the sequence of calls including information identifying a plurality of destinations, of the multiple destinations, and being based on a first time of day associated with receiving the called party information, and
a second order of the sequence of calls including information identifying a plurality of destinations, of the multiple destinations, and being based on a second time of day associated with receiving the called party information,
the first order being different than the second order and the first time of day being different than the second time of day;
receive, based on a call to a first destination of the multiple destinations, information, from the first destination, indicating a busy condition; and
execute a busy condition treatment by sending, based on stored information indicating that a continue command is associated with the busy condition, another call to the first destination before sending a call, of the sequence of calls, to a second destination of the multiple destinations.

* * * * *